(12) United States Patent
Kobayashi et al.

(10) Patent No.: US 9,118,904 B2
(45) Date of Patent: *Aug. 25, 2015

(54) IMAGE PROCESSING APPARATUS, IMAGE PROCESSING METHOD, AND PROGRAM FOR GENERATING A THREE DIMENSIONAL IMAGE TO BE STEREOSCOPICALLY VIEWED

(71) Applicant: Sony Corporation, Tokyo (JP)

(72) Inventors: Seiji Kobayashi, Kanagawa (JP); Atsushi Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,234

(22) Filed: Dec. 9, 2014

(65) Prior Publication Data

US 2015/0156476 A1 Jun. 4, 2015

Related U.S. Application Data

(63) Continuation of application No. 13/550,804, filed on Jul. 17, 2012, now Pat. No. 8,982,190.

(30) Foreign Application Priority Data

Aug. 4, 2011 (JP) .................................. 2011-171039

(51) Int. Cl.
*H04N 13/02* (2006.01)
*H04N 13/04* (2006.01)
(Continued)

(52) U.S. Cl.
CPC .......... *H04N 13/026* (2013.01); *H04N 13/0225* (2013.01); *H04N 13/0296* (2013.01); *H04N 2013/0096* (2013.01)

(58) Field of Classification Search
CPC .......... H04N 13/0207; H04N 13/0011; H04N 13/0438; H04N 13/021; H04N 13/0239; G02B 27/26
USPC ....................................... 348/43–49
See application file for complete search history.

(56) References Cited

U.S. PATENT DOCUMENTS 5,838,360 A * 11/1998 Harrold et al. ................ 347/258
8,212,858 B2 7/2012 Schechterman et al.
(Continued)

FOREIGN PATENT DOCUMENTS

| CN | 101995758 A | 3/2011 |
| JP | 06-054991 B2 | 7/1994 |

(Continued)

*Primary Examiner* — Victor Kostak
(74) *Attorney, Agent, or Firm* — Wolf, Greenfield & Sacks, P.C.

(57) ABSTRACT

There is provided an imaging element that photographs multiple viewing point images corresponding to images observed from different viewing points and an image processing unit separates an output signal of the imaging element, acquires the plurality of viewing point images corresponding to the images observed from the different viewing points, and generates a left eye image and a right eye image for three-dimensional image display, on the basis of the plurality of acquired viewing point images. The image processing unit generates parallax information on the basis of the plurality of viewing point images obtained from the imaging element and generates a left eye image and a right eye image for three-dimensional image display by 2D3D conversion processing using the generated parallax information. By this configuration, a plurality of viewing point images are acquired on the basis of one photographed image and images for three-dimensional image display are generated.

18 Claims, 25 Drawing Sheets

(51) Int. Cl.
*G02B 27/26* (2006.01)
*H04N 13/00* (2006.01)

(56) References Cited

U.S. PATENT DOCUMENTS

| | | |
|---|---|---|
| 2002/0054208 A1 | 5/2002 | Goldstein et al. |
| 2005/0089212 A1 | 4/2005 | Mashitani et al. |
| 2008/0204663 A1* | 8/2008 | Balogh ............ 353/10 |
| 2008/0259281 A1* | 10/2008 | Odake et al. ........ 353/7 |
| 2009/0167922 A1* | 7/2009 | Perlman et al. ...... 348/340 |
| 2010/0073463 A1* | 3/2010 | Momonoi et al. ..... 348/47 |
| 2010/0309291 A1 | 12/2010 | Martinez et al. |
| 2010/0321476 A1 | 12/2010 | Martinez et al. |
| 2011/0033177 A1 | 2/2011 | Kuroki |
| 2011/0228053 A1* | 9/2011 | Aoki ............... 348/49 |
| 2012/0105598 A1 | 5/2012 | Hiramoto et al. |
| 2012/0212587 A1 | 8/2012 | Otani |
| 2012/0249752 A1 | 10/2012 | Baba |
| 2012/0320164 A1 | 12/2012 | Lipton |
| 2013/0016189 A1 | 1/2013 | Hosaka |
| 2013/0033575 A1 | 2/2013 | Kobayashi et al. |
| 2013/0083172 A1 | 4/2013 | Baba |
| 2013/0188023 A1 | 7/2013 | Kuang et al. |
| 2014/0218486 A1 | 8/2014 | Kobayashi et al. |

FOREIGN PATENT DOCUMENTS

| | | |
|---|---|---|
| JP | 2000-112019 A | 4/2000 |
| JP | 2003-523646 A | 8/2003 |
| JP | 2004-309868 A | 11/2004 |
| JP | 2011-035853 A | 2/2011 |
| JP | 2011-145343 A | 7/2011 |
| JP | 2011-520398 A | 7/2011 |

* cited by examiner

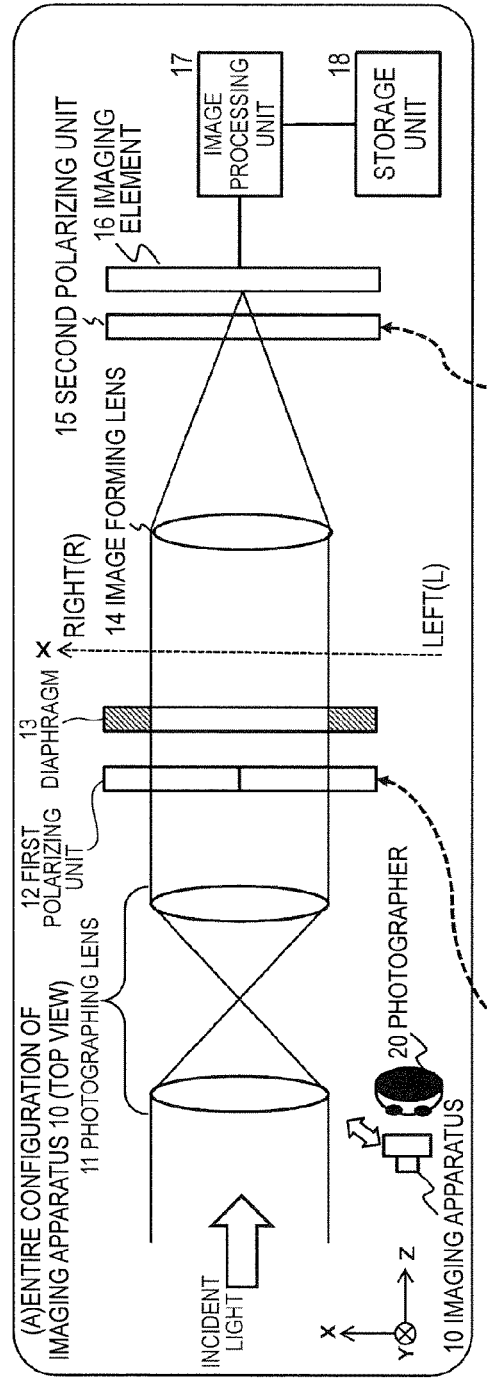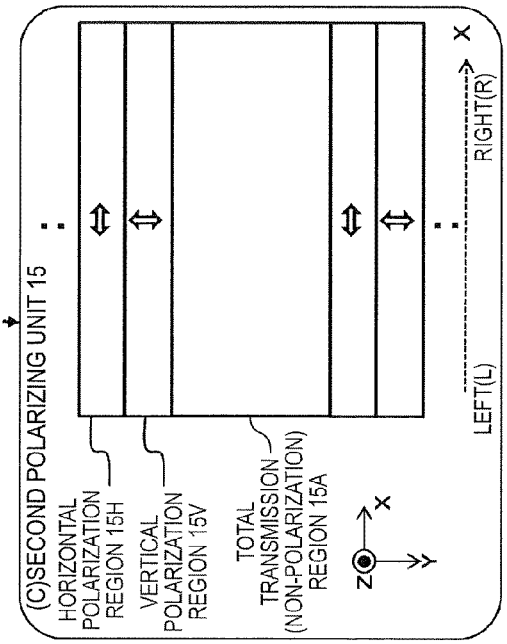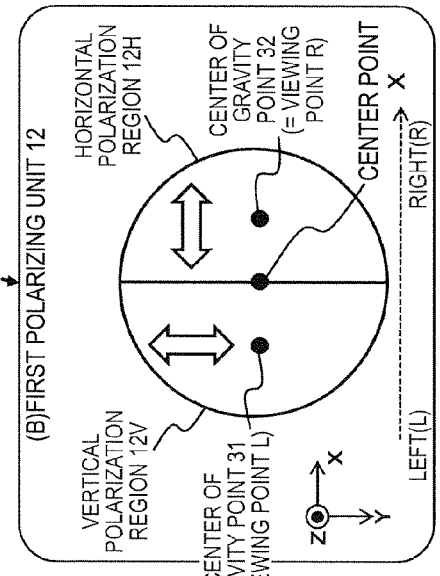

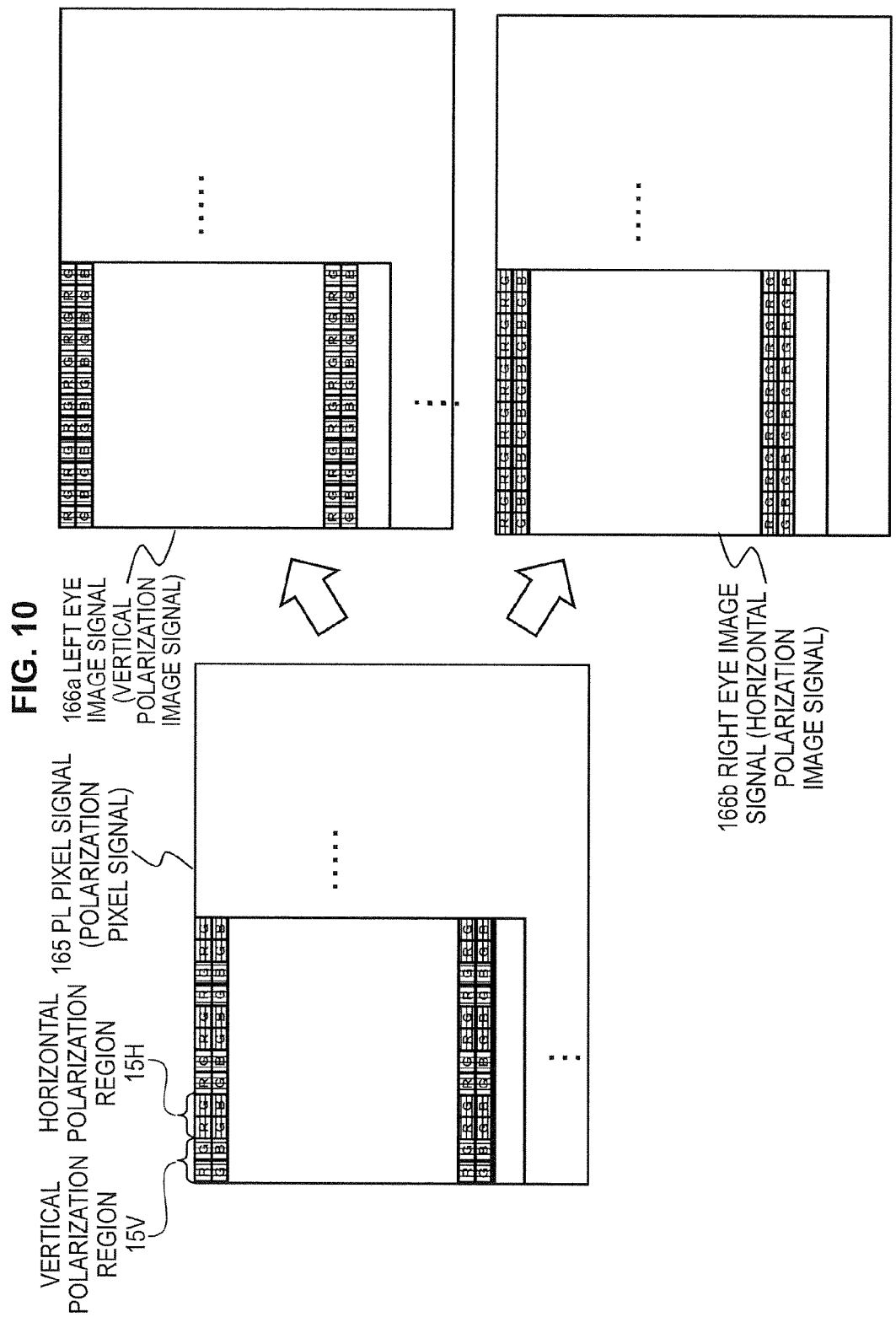

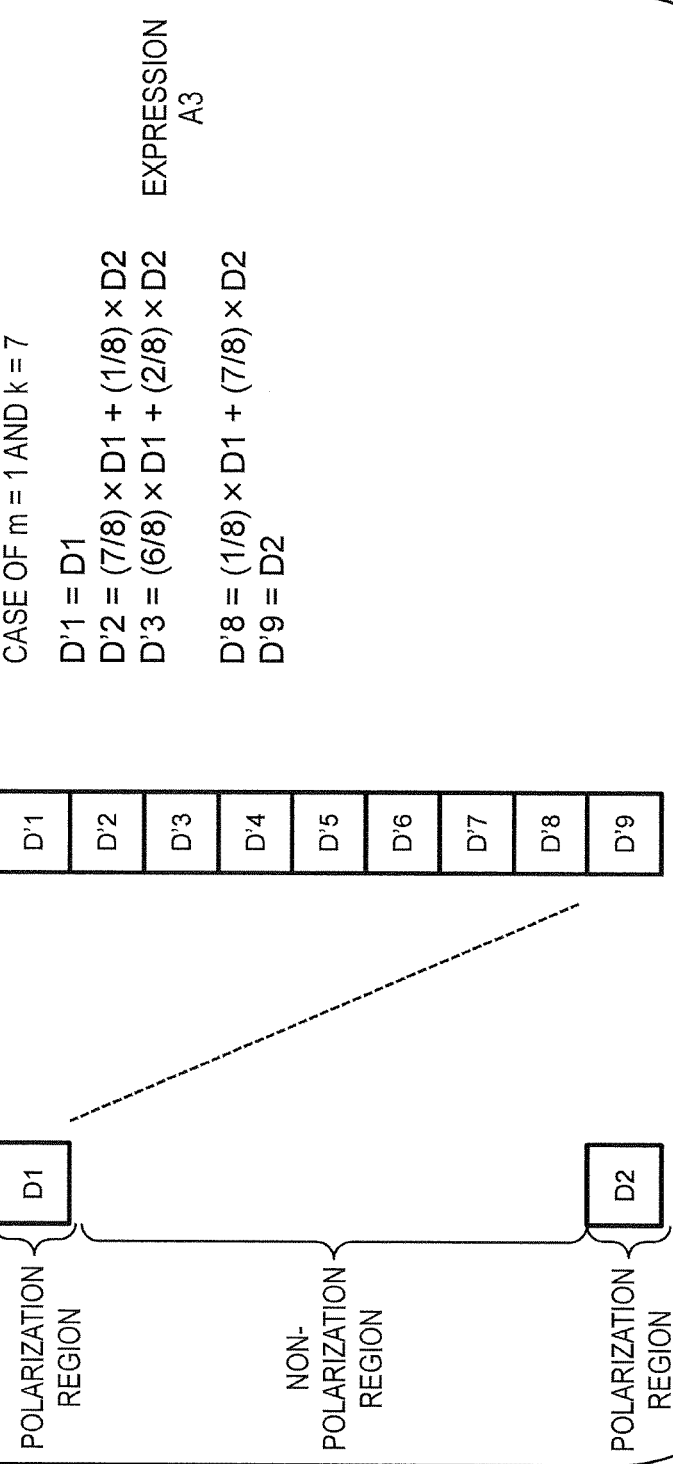

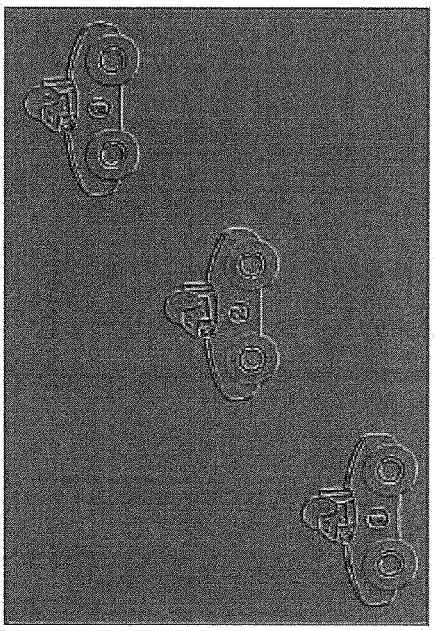
FIG. 16A (a) INPUT SIGNAL
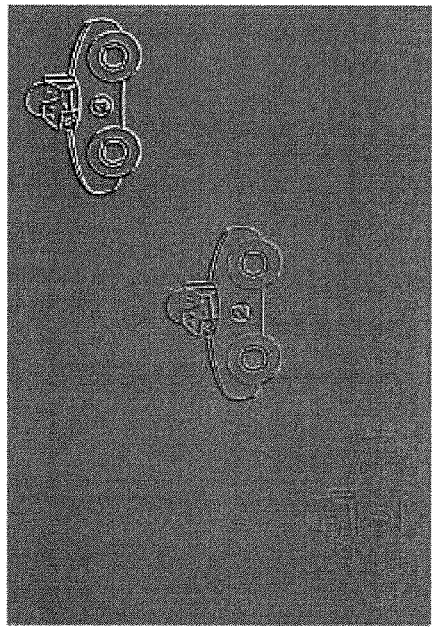
FIG. 16B (b) DIFFERENTIAL SIGNAL
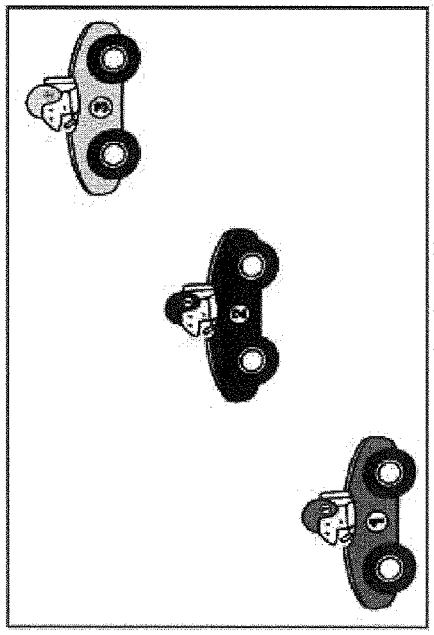
FIG. 16C (c) DEPTH INFORMATION
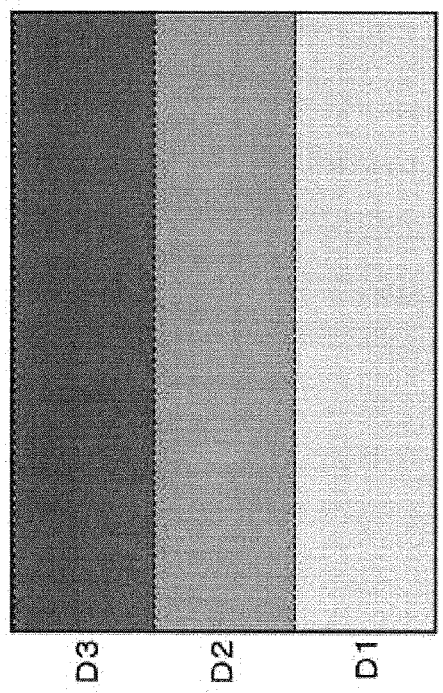
FIG. 16D (d) CORRECTED DIFFERENTIAL SIGNAL

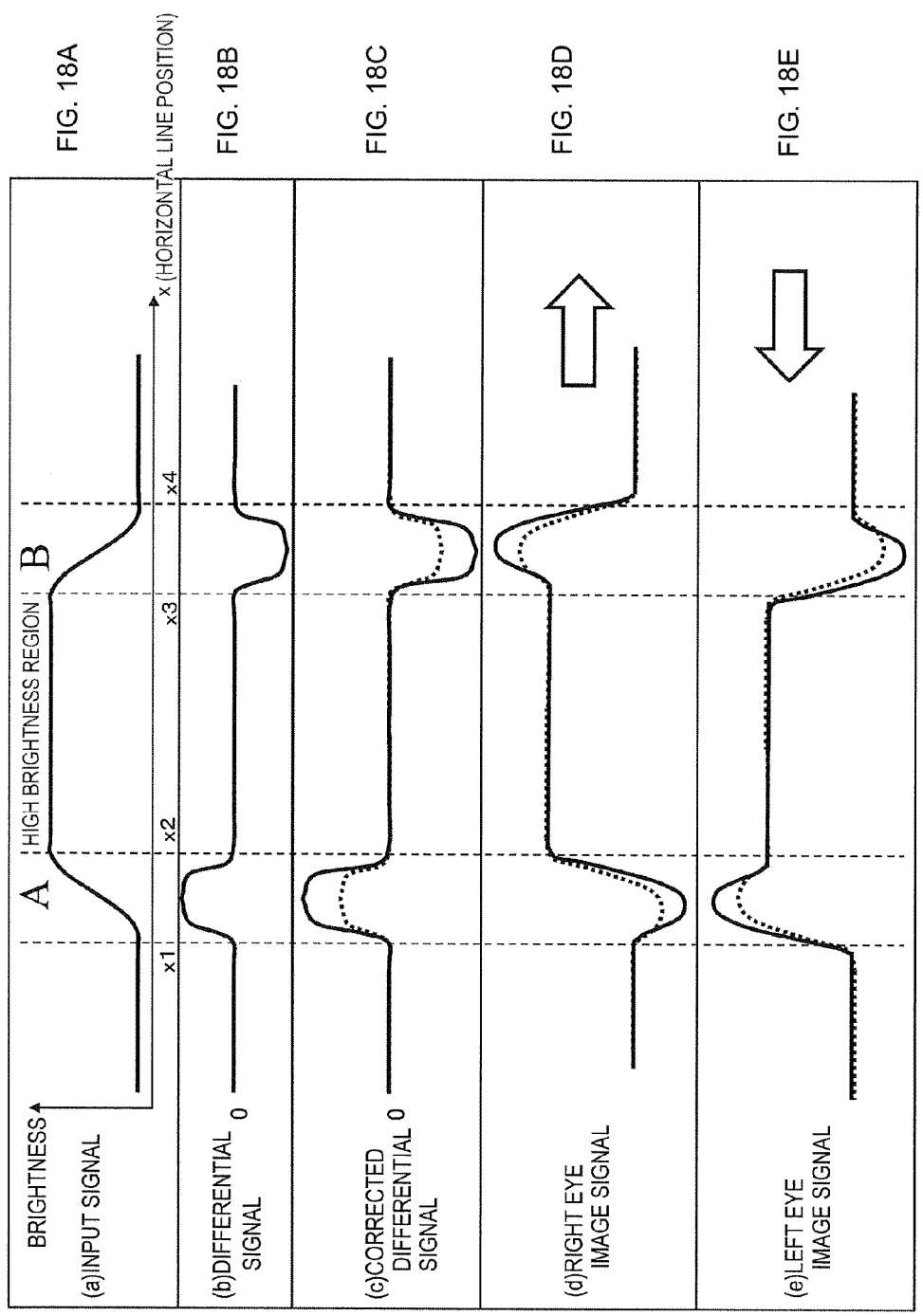

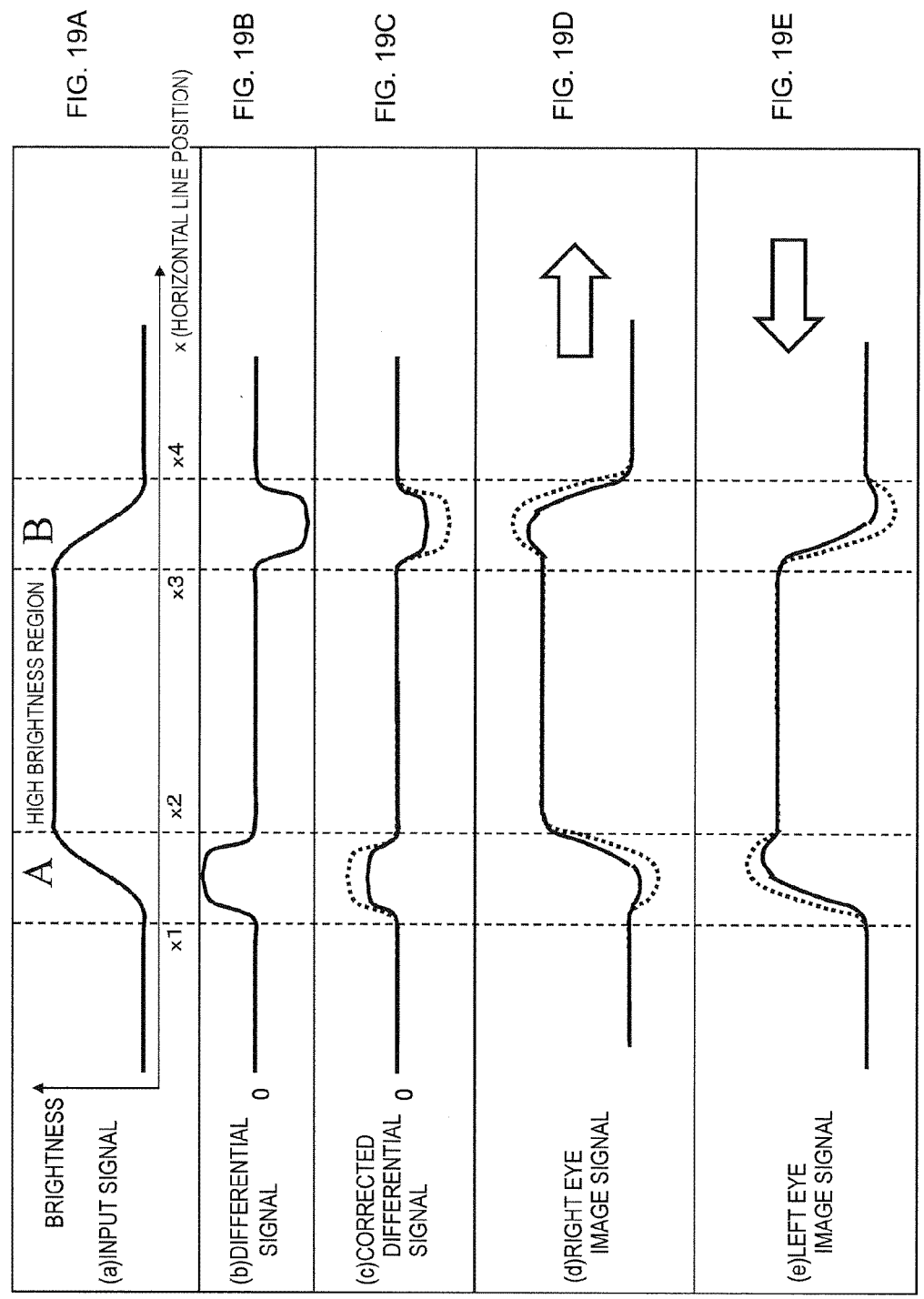

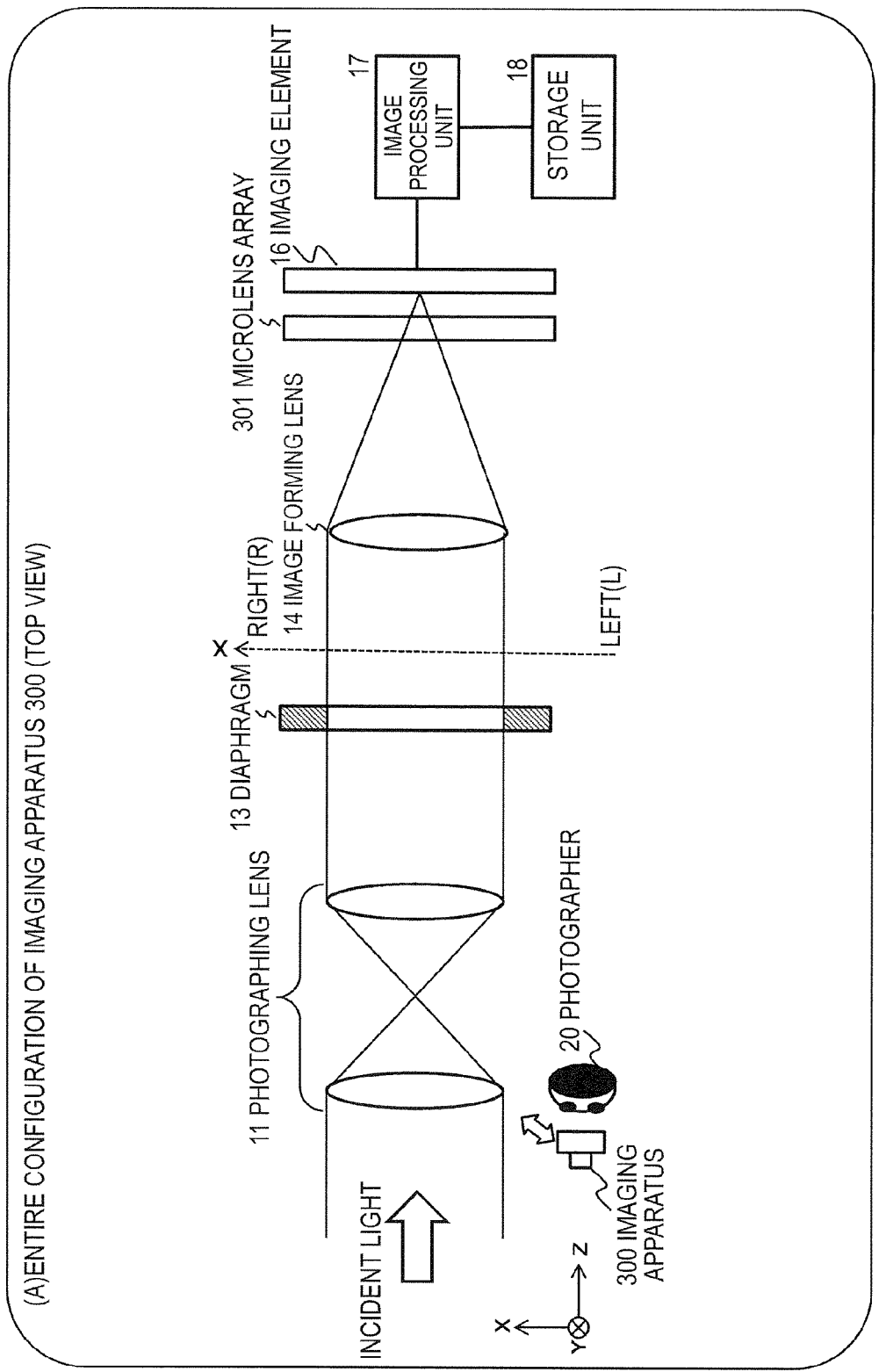

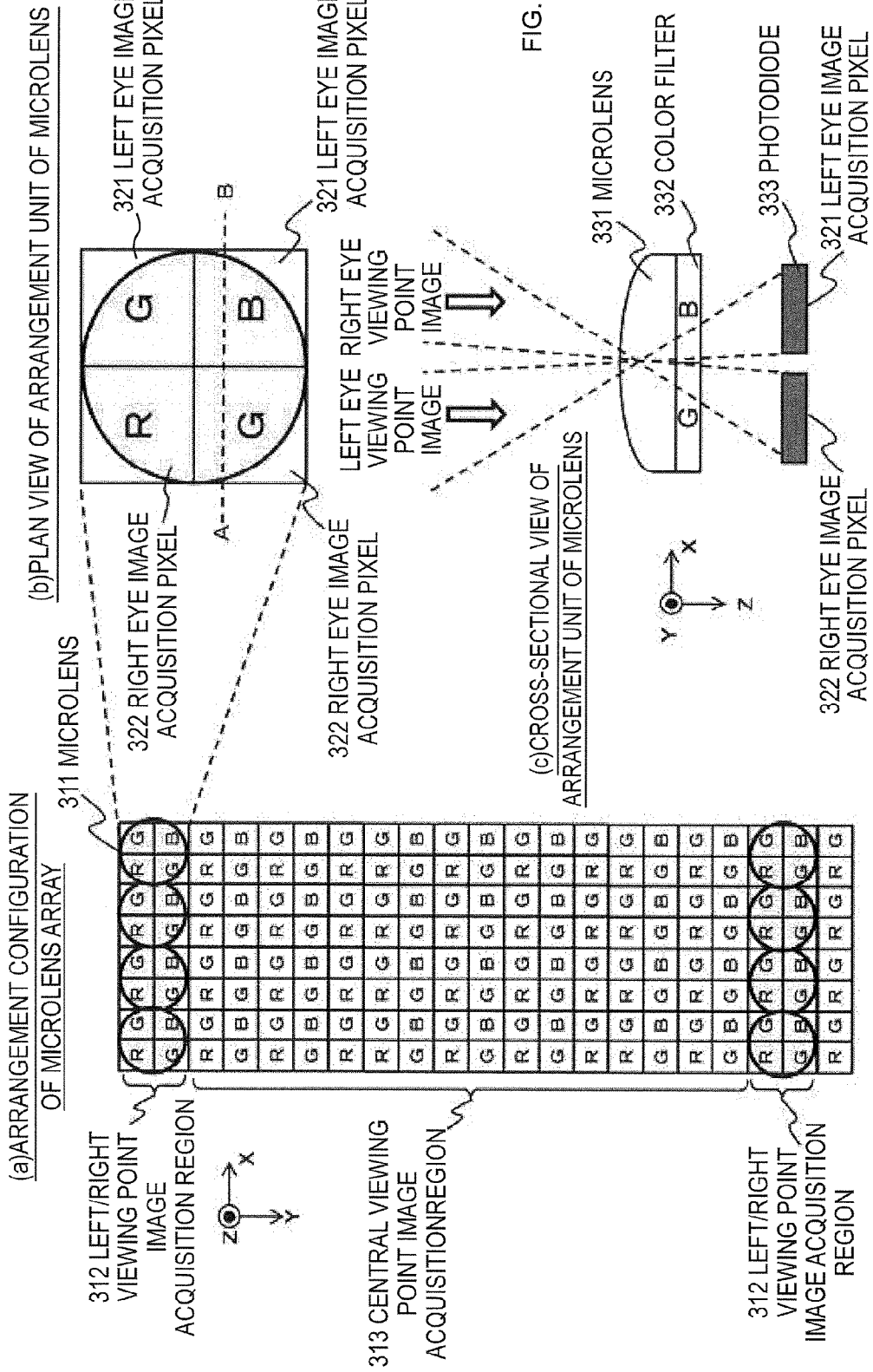

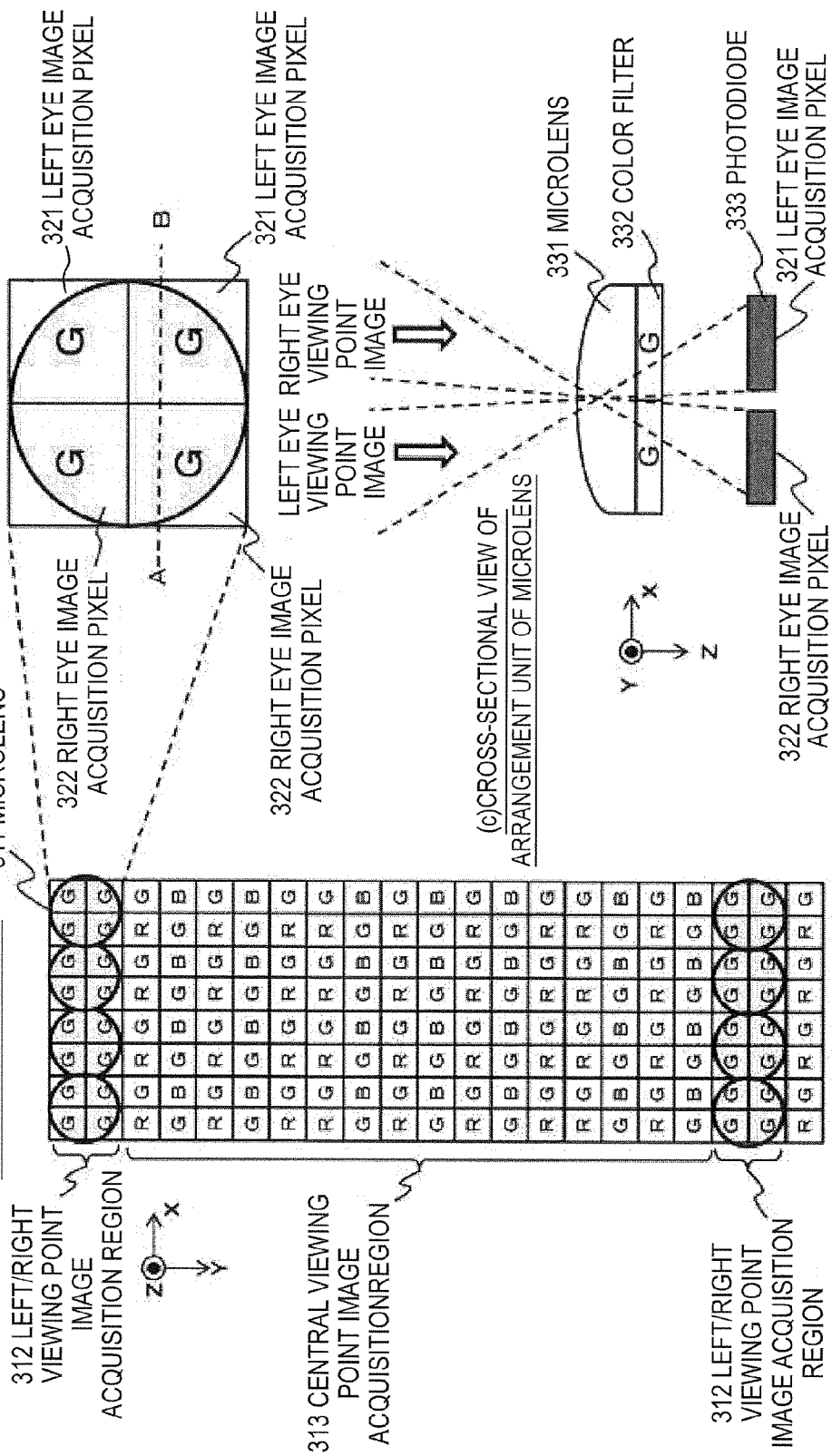

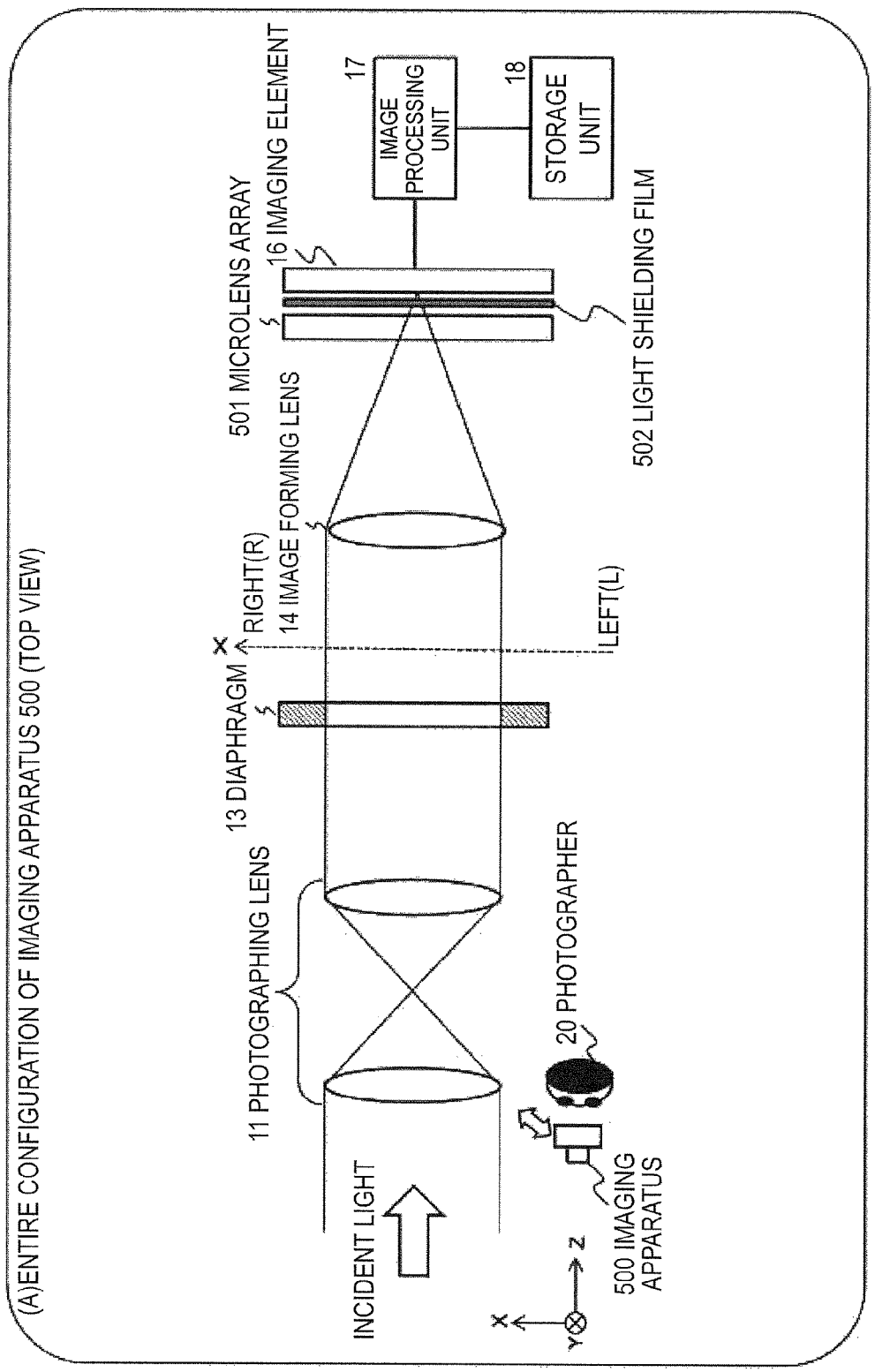

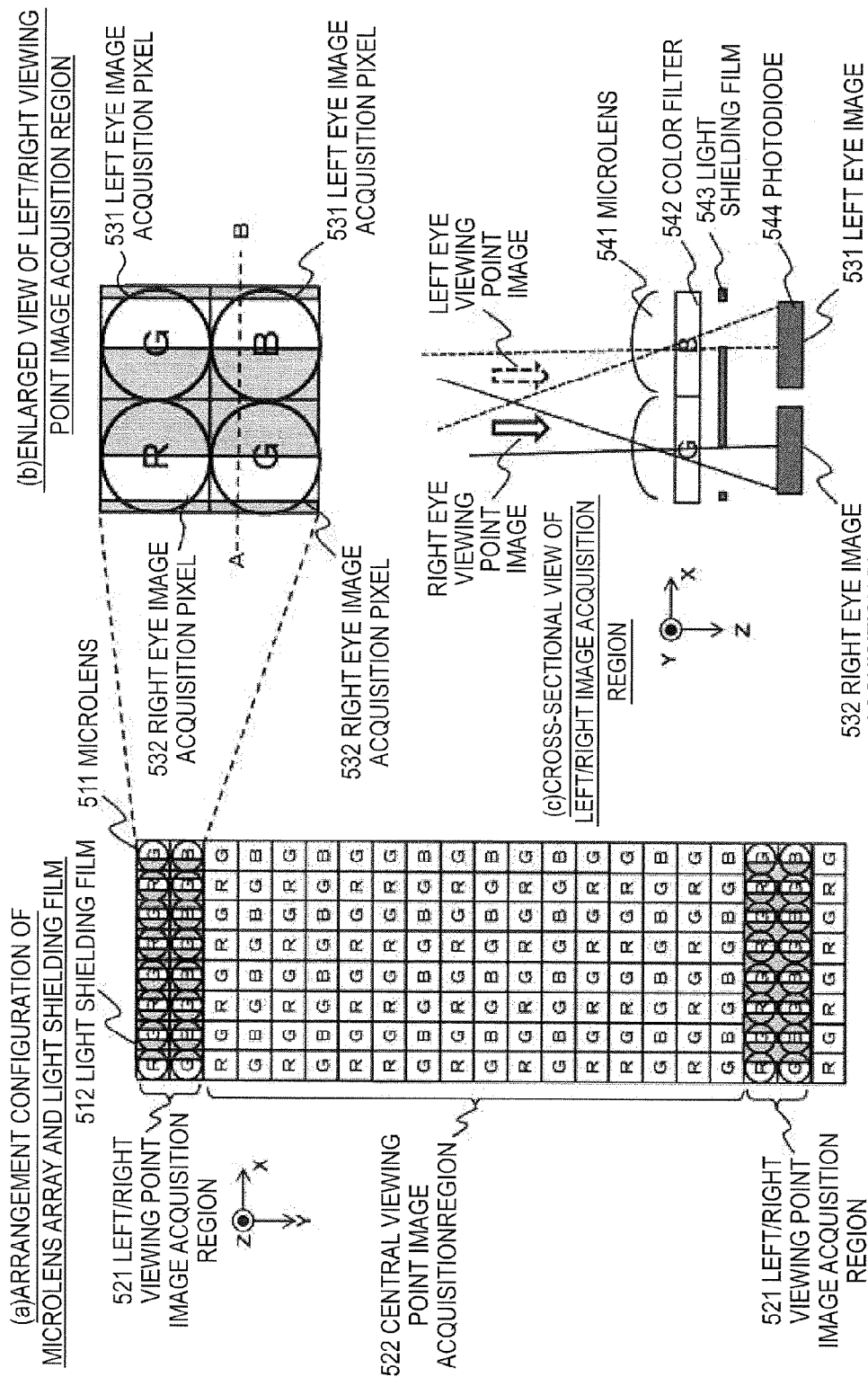

IMAGE PROCESSING APPARATUS, IMAGE PROCESSING METHOD, AND PROGRAM FOR GENERATING A THREE DIMENSIONAL IMAGE TO BE STEREOSCOPICALLY VIEWED

CROSS REFERENCES TO RELATED APPLICATIONS

This application is a continuation of and claims the benefit under 35 U.S.C. §120 of U.S. patent application Ser. No. 13/550,804, titled "IMAGE PROCESSING APPARATUS, IMAGE PROCESSING METHOD, AND PROGRAM," filed on Jul. 17, 2012, and now pending, which claims the benefit under 35 U.S.C. §119 of Japanese Patent Application No. 2011-171039, filed on Aug. 4, 2011, each of which is hereby incorporated by reference in its entirety.

BACKGROUND

The present disclosure relates to an image processing apparatus, an image processing method, and a program. More specifically, the present disclosure relates to an image processing apparatus, an image processing method, and a program that execute processing for generating a three-dimensional image (3D image) to be stereoscopically viewed (three-dimensionally viewed).

A stereoscopic image (three-dimensional image) that can be viewed as a three-dimensional image having depth is configured of a combination of two images of an image for a left eye and an image for a right eye, which are images from different viewing points. In order to obtain the images from the two viewing points, that is, binocular parallax images, two imaging apparatuses are arranged at left and right sides to be apart from each other and capture images.

A pair of captured stereoscopic images are configured using a pair of images including an image for a left eye to be captured by the left imaging apparatus and observed by the left eye and an image for a right eye to be captured by the right imaging apparatus and observed by the right eye.

The pair of stereoscopic images that are configured using the pair of images including the image for the left eye and the image for the right eye are displayed on a display apparatus that can separate the image for the left eye and the image for the right eye to be viewed by the left eye and the right eye of an observer, such that the observer can recognize the images as a three-dimensional image.

However, when the images from the two viewing points are photographed using the two cameras, precise synchronization control of the two cameras should be performed, the synchronization control is very difficult, and accurate control of a convergence angle is very difficult.

A three-dimensional photographing apparatus in which polarization filters polarized to become orthogonal in relation are combined to facilitate adjustment of a lens system to perform three-dimensional photographing and an optical system is shared is disclosed in A stereoscopic image (three-dimensional image) that can be viewed as a three-dimensional image having depth is configured of a combination of two images of an image for a left eye and an image for a right eye, which are images from different viewing points. In order to obtain the images from the two viewing points, that is, binocular parallax images, two imaging apparatuses are arranged at left and right sides to be apart from each other and capture images.

A pair of captured stereoscopic images are configured using a pair of images including an image for a left eye to be captured by the left imaging apparatus and observed by the left eye and an image for a right eye to be captured by the right imaging apparatus and observed by the right eye.

The pair of stereoscopic images that are configured using the pair of images including the image for the left eye and the image for the right eye are displayed on a display apparatus that can separate the image for the left eye and the image for the right eye to be viewed by the left eye and the right eye of an observer, such that the observer can recognize the images as a three-dimensional image.

However, when the images from the two viewing points are photographed using the two cameras, precise synchronization control of the two cameras should be performed, the synchronization control is very difficult, and accurate control of a convergence angle is very difficult.

A three-dimensional photographing apparatus in which polarization filters polarized to become orthogonal in relation are combined to facilitate adjustment of a lens system to perform three-dimensional photographing and an optical system is shared is disclosed in Patent Document 1.

A method of performing three-dimensional photographing by an imaging apparatus including two lenses and one imaging unit is disclosed in Patent Document 2. The imaging apparatus that is disclosed in Patent Document 2 sets (a) a combination configuration of a lens and a horizontal component polarization filter and (b) a combination configuration of a lens and a vertical component polarization filter arranged to be apart from each other by an interval according to human parallax to positions apart from an imaging surface of a CCD by a predetermined distance and acquires an image for a left eye and an image for a right eye using the two combination configurations of (a) and (b).

A method of performing three-dimensional photographing by an imaging apparatus including two lenses and one imaging unit is disclosed in Patent Document 2. The imaging apparatus that is disclosed in Patent Document 2 sets (a) a combination configuration of a lens and a horizontal component polarization filter and (b) a combination configuration of a lens and a vertical component polarization filter arranged to be apart from each other by an interval according to human parallax to positions apart from an imaging surface of a CCD by a predetermined distance and acquires an image for a left eye and an image for a right eye using the two combination configurations of (a) and (b).

SUMMARY

According to technology that is disclosed in Japanese Patent Application Publication No. 6-054991, the lens system is shared by overlapping outputs of the two polarization filters and forming a single optical path.

However, a polarization filter should be further provided to extract the image for the left eye and the image for the right eye in the following step, the optical path should be divided again, and light should be incident on each polarization filter. For this reason, light loss is generated in the lens system and it is difficult to decrease a size of the apparatus.

According to technology that is disclosed in Patent Document 2, because the two sets of lenses and polarization filters should be provided, the apparatus becomes complex and a size of the apparatus increases.

The present disclosure has been made in light of the foregoing, for example. The present disclosure aims to provide an image processing apparatus, an image processing method and a program for generating an image that can be viewed as a three-dimensional image that execute processing for an image captured by one imaging apparatus.

According to the first embodiment of the present disclosure, there is provided an image processing apparatus including an imaging element, an incident light control unit that performs incident light control to cause the imaging element to photograph a plurality of viewing point images corresponding to images observed from different viewing points, and an image processing unit that executes signal processing for an output signal of the imaging element. The incident light control unit has an incident light control configuration to acquire three viewing point images of a left eye viewing point image, a right eye viewing point image, and a central viewing point image, and the image processing unit includes a parallax detecting unit that applies two different viewing point images of the left eye viewing point image and the right eye viewing point image and generates parallax information in which an object distance is reflected, an image correcting unit that executes correction processing for the central viewing point image from the imaging element and generates a two-dimensional image, and a parallax image generating unit that applies the parallax information generated by the parallax detecting unit, executes image conversion processing of the two-dimensional image generated by the image correcting unit, and generates a left eye image and a right eye image for three-dimensional image display.

The incident light control unit includes a first polarizing unit that has a first polarization region and a second polarization region to transmit different polarized light, and a second polarizing unit that causes transmission light of the first polarizing unit to be incident and includes a third polarization region to transmit only the transmission light of the first polarization region, a fourth polarization region to transmit only the transmission light of the second polarization region, and a total transmission region to transmit the transmission light of the first polarization region and the second polarization region, and the image processing unit includes a parallax detecting unit that applies two different viewing point images of an image based on the transmission light of the third polarization region of the second polarizing unit and an image based on the transmission light of the fourth polarization region of the second polarizing unit and generates parallax information in which an object distance is reflected, an image correcting unit that executes correction processing for an input image from the imaging element and generates a two-dimensional image, and a parallax image generating unit that applies the parallax information generated by the parallax detecting unit, executes image conversion processing of the two-dimensional image generated by the image correcting unit, and generates a left eye image and a right eye image for three-dimensional image display.

The third polarization region and the fourth polarization region of the second polarizing unit are polarization regions that are configured using a wire grid polarizer.

The incident light control unit has a microlens array in which microlenses are arranged on a part of a region of the imaging element, and the image processing unit includes a parallax detecting unit that applies two different viewing point images obtained from output signals from pixels forming the imaging element corresponding to a microlens arrangement region and generates parallax information in which an object distance is reflected, an image correcting unit that executes correction processing for an image obtained from output signals from pixels forming the imaging element corresponding to a microlens non-setting region and generates a two-dimensional image, and a parallax image generating unit that applies the parallax information generated by the parallax detecting unit, executes image conversion processing of the two-dimensional image generated by the image correcting unit, and generates a left eye image and a right eye image for three-dimensional image display.

The incident light control unit includes a microlens array in which microlenses are arranged on a part of a region of the imaging element, and a light shielding film that is set to an arrangement region of the microlenses and shields a part of incident light with respect to the imaging element, and the image processing unit includes a parallax detecting unit that applies two different viewing point images obtained from output signals from pixels forming the imaging element corresponding to the arrangement region of the microlenses and the light shielding film and generates parallax information in which an object distance is reflected, an image correcting unit that executes correction processing with respect to an image obtained from output signals of pixels forming the imaging element corresponding to a non-setting region of the microlenses and the light shielding film and generates a two-dimensional image, and a parallax image generating unit that applies the parallax information generated by the parallax detecting unit, executes image conversion processing of the two-dimensional image generated by the image correcting unit, and generates a left eye image and a right eye image for three-dimensional image display.

The imaging element includes a left/right viewing point image acquisition region to acquire two different viewing point images to generate parallax information in which an object distance is reflected, and a central viewing point image acquisition region to generate an image photographed from one viewing point.

The left/right viewing point image acquisition region is configured using pixels of one color, and the image processing unit has a parallax detecting unit that applies two different viewing point images obtained from output signals of the left/right viewing point image acquisition region configured using the pixels of one color, and generates parallax information in which an object distance is reflected.

The image processing unit applies two different viewing point images obtained from output signals from pixels forming the imaging element and generates a depth map in which object distance information of images is reflected as parallax information in which an object distance is reflected, and generates a left eye image and a right eye image for three-dimensional image display by image conversion processing to which the depth map is applied.

The image processing unit includes a parallax detecting unit that applies two different viewing point images obtained from the imaging element and generates parallax information in which an object distance is reflected, an image correcting unit that executes correction processing for the images obtained from the imaging element and generates a two-dimensional image, and a parallax image generating unit that applies the parallax information generated by the parallax detecting unit, executes image conversion processing of the two-dimensional image generated by the image correcting unit, and generates a left eye image and a right eye image for three-dimensional image display.

The parallax image generating unit executes 2D3D conversion processing for generating the left eye image and the right eye image for three-dimensional image display by image conversion processing to which the parallax information is applied, for the two-dimensional image generated by the image correcting unit.

The 2D3D conversion processing that is executed by the image processing unit is 2D3D conversion processing for executing image shift processing according to the object distance for the first viewing point images and generating the left eye image and the right eye image for three-dimensional image display.

According to the second embodiment of the present disclosure, there is provided an image processing apparatus including an imaging element, an incident light control unit that performs incident light control to cause the imaging element to photograph a plurality of viewing point images corresponding to images observed from different viewing points, and an image processing unit that executes signal processing for an output signal of the imaging element. The incident light control unit includes a first polarizing unit that has a first polarization region and a second polarization region to transmit different polarized light, and a second polarizing unit that causes transmission light of the first polarizing unit to be incident and includes a third polarization region to transmit only the transmission light of the first polarization region and a fourth polarization region to transmit only the transmission light of the second polarization region, and the image processing unit executes interpolation processing for setting pixel values to defective pixel regions of two different viewing point images of an image based on transmission light of the third polarization region of the second polarizing unit and an image based on transmission light of the fourth polarization region of the second polarizing unit, and generates a left eye image and a right eye image for three-dimensional image display.

The third polarization region and the fourth polarization region of the second polarizing unit are polarization regions that are configured using a wire grid polarizer.

According to the third embodiment of the present disclosure, there is provided an image processing method of executing image processing in an image processing apparatus, including separating, by an image processing unit, an output signal from an imaging element into a plurality of viewing point images corresponding to images observed from different viewing points by separation processing of the output signal from the imaging element, applying, by the imaging processing unit, two different viewing point images obtained by the separation processing in the separation step, and generating parallax information in which an object distance is reflected, executing, by the imaging processing unit, correction processing for an input image from the imaging element, and generating a two-dimensional image, and applying, by the image processing unit, the parallax information generated in the parallax detection step, executing image conversion processing of the two-dimensional image generated in the image correction step, and generating a left eye image and a right eye image for three-dimensional image display.

According to the fourth embodiment of the present disclosure, there is provided a program for causing an image processing apparatus to execute image processing. The program causes an image processing unit to separate an output signal from an imaging element into a plurality of viewing point images corresponding to images observed from different viewing points by separation processing of the output signal from the imaging element, apply two different viewing point images obtained by the separation processing in the separation step and generate parallax information in which an object distance is reflected, execute correction processing for an input image from the imaging element and generate a two-dimensional image, and apply the parallax information generated in the parallax detection step, execute image conversion processing of the two-dimensional image generated in the image correction step, and generate a left eye image and a right eye image for three-dimensional image display.

The program according to the present disclosure is recorded in a recording medium and is provided to an information processing apparatus or a computer system that can execute various program codes. By executing the program by a program executing unit on the information processing apparatus or the computer system, processing according to the program is realized.

Other objects, features, and advantages of the present disclosure will be more apparent from the following description taken in conjunction with the embodiments and the accompanying drawings. In the present disclosure, a system has a logical set configuration of a plurality of apparatuses and each apparatus may not be provided in the same casing.

As described above, according to one embodiment of the present disclosure, a plurality of viewing point images can be acquired on the basis of one photographed image and an image for three-dimensional image display can be generated.

Specifically, an imaging element photographs a plurality of viewing point images corresponding to images observed from different viewing points and an image processing unit separates an output signal of the imaging element, acquires the plurality of viewing point images corresponding to the images observed from the different viewing points, and generates a left eye image and a right eye image for three-dimensional image display, on the basis of the plurality of acquired viewing point images. The image processing unit generates parallax information on the basis of the plurality of viewing point images obtained from the imaging element and generates a left eye image and a right eye image for three-dimensional image display by 2D3D conversion processing using the generated parallax information. By this configuration, a configuration in which a plurality of viewing point images are acquired on the basis of one photographed image and images for three-dimensional image display are generated is realized.

BRIEF DESCRIPTION OF THE DRAWINGS

FIG. 1A is a diagram illustrating a first part of an entire configuration of an embodiment of an image processing apparatus;

FIG. 1B is a diagram illustrating a second part of an entire configuration of an embodiment of an image processing apparatus;

FIG. 1C is a diagram illustrating a third part of an entire configuration of an embodiment of an image processing apparatus;

FIG. 10 is a diagram illustrating a processing example of a left/right viewing point image interpolation processing unit;

FIG. 12 is a diagram illustrating a processing example of a parallax detecting unit;

FIG. 16A is a diagram illustrating a first part of an example of processing for controlling an amplitude value of a differential signal in a gain control unit;

FIG. 16B is a diagram illustrating a second part of an example of processing for controlling an amplitude value of a differential signal in a gain control unit;

FIG. 16C is a diagram illustrating a third part of an example of processing for controlling an amplitude value of a differential signal in a gain control unit;

FIG. 16D is a diagram illustrating a fourth part of an example of processing for controlling an amplitude value of a differential signal in a gain control unit;

FIG. 18A is a diagram illustrating a first signal in image synthesis processing executed in an image synthesizing unit;

FIG. 18B is a diagram illustrating a second signal in image synthesis processing executed in an image synthesizing unit;

FIG. 18C is a diagram illustrating a third signal in image synthesis processing executed in an image synthesizing unit;

FIG. 18D is a diagram illustrating a fourth signal in image synthesis processing executed in an image synthesizing unit;

FIG. 18E is a diagram illustrating a fifth signal in image synthesis processing executed in an image synthesizing unit;

FIG. 19A is a diagram illustrating a first signal in image synthesis processing executed in an image synthesizing unit;

FIG. 19B is a diagram illustrating a second signal in image synthesis processing executed in an image synthesizing unit;

FIG. 19C is a diagram illustrating a third signal in image synthesis processing executed in an image synthesizing unit;

FIG. 19D is a diagram illustrating a fourth signal in image synthesis processing executed in an image synthesizing unit;

FIG. 19E is a diagram illustrating a fifth signal in image synthesis processing executed in an image synthesizing unit;

FIG. 20 is a diagram illustrating an entire configuration of an embodiment of an image processing apparatus;

FIG. 21A is a diagram illustrating a first view of a configuration of an imaging element, an arrangement configuration of a microlens array, and processing for acquiring left/right viewing point images;

FIG. 21B is a diagram illustrating a second view of a configuration of an imaging element, an arrangement configuration of a microlens array, and processing for acquiring left/right viewing point images;

FIG. 21C is a diagram illustrating a third view of a configuration of an imaging element, an arrangement configuration of a microlens array, and processing for acquiring left/right viewing point images;

FIG. 22A is a diagram illustrating a first view of a configuration of an imaging element, an arrangement configuration of a microlens array, and processing for acquiring left/right viewing point images;

FIG. 22B is a diagram illustrating a second view of a configuration of an imaging element, an arrangement configuration of a microlens array, and processing for acquiring left/right viewing point images;

FIG. 22C is a diagram illustrating a third view of a configuration of an imaging element, an arrangement configuration of a microlens array, and processing for acquiring left/right viewing point images;

FIG. 23 is a diagram illustrating an entire configuration of an embodiment of an image processing apparatus;

FIG. 24A is a diagram illustrating a first view of a configuration of an imaging element, an arrangement configuration of a microlens array, and processing for acquiring left/right viewing point images;

FIG. 24B is a diagram illustrating a second view of a configuration of an imaging element, an arrangement configuration of a microlens array, and processing for acquiring left/right viewing point images;

FIG. 24C is a diagram illustrating a third view of a configuration of an imaging element, an arrangement configuration of a microlens array, and processing for acquiring left/right viewing point images;

DETAILED DESCRIPTION OF THE EMBODIMENT(S)

Figure 2:
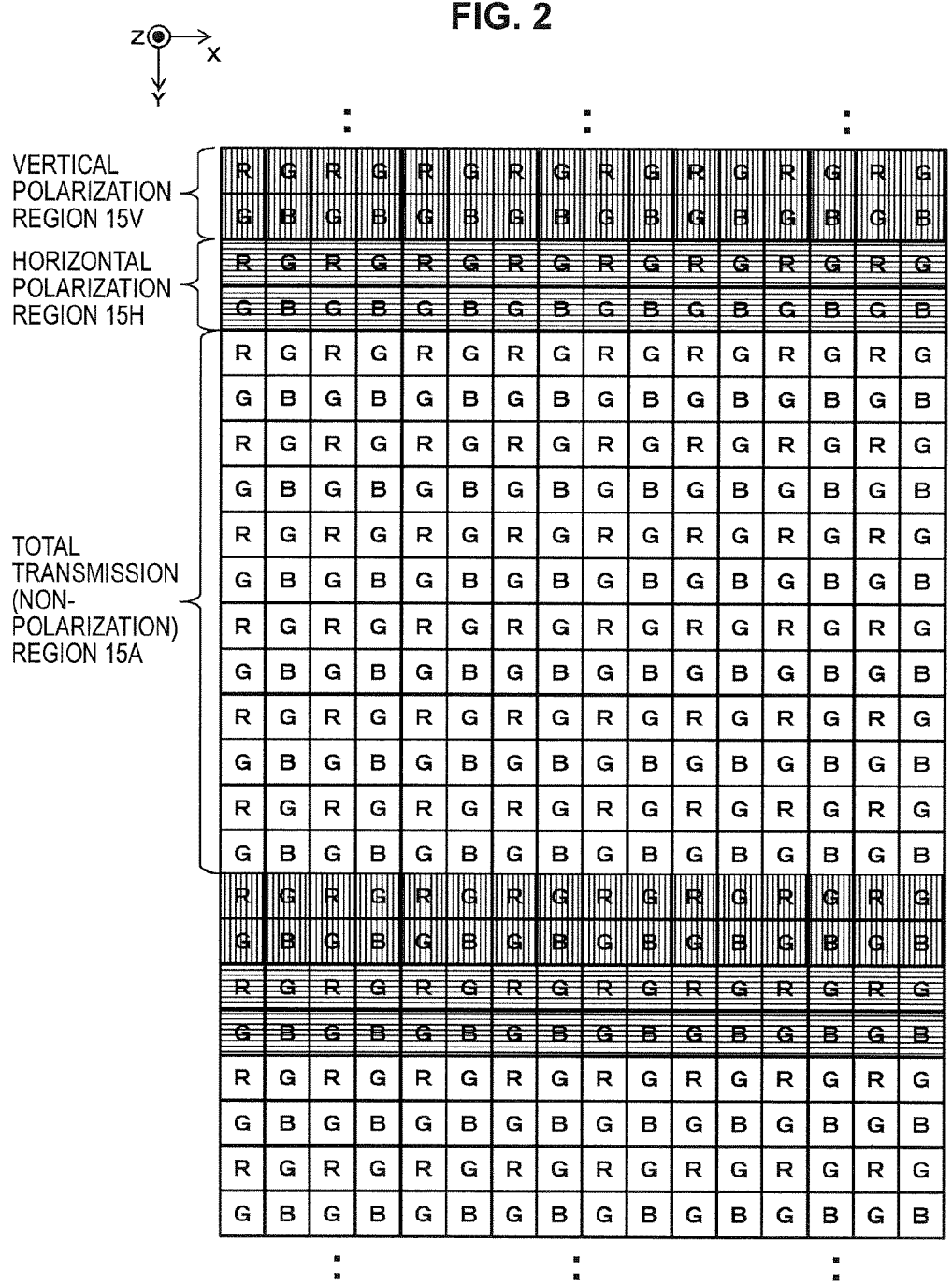
FIG. 2 is a diagram illustrating a configuration example of a second polarizing unit and an imaging element.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image processing apparatus, an image processing method, and a program of the present disclosure will be described in detail with reference to the appended drawings. The following description will be made in the order described below.

1. Outline of Configuration and Processing of Image Processing Apparatus

2. Image Processing in Application Configuration of Full Grid Type Second Polarizing Unit 3. Image Processing in Application Configuration of Interpolation Grid Type Second Polarizing Unit 4. Example of Acquisition Configuration of Plurality of Viewing Point Images using Microlens 5. Example of Acquisition Configuration of Plurality of Viewing Point Images using Microlens and Light Shielding Film 6. Summary of Configuration of Present Disclosure

[1. Outline of Configuration and Processing of Image Processing Apparatus]

An outline of a configuration and processing of an image processing apparatus of the present disclosure will be described with reference to FIGS. 1A to 1C. FIGS. 1A to 1C are diagrams illustrating a configuration of an imaging apparatus that is an example of the image processing apparatus.

In an imaging apparatus 10 illustrated in FIG. 1A, incident light corresponding to a photographed object is input through a photographing lens 11.

The light that is incident through the photographing lens 11 is input to an imaging element 16 through a first polarizing unit 12, a diaphragm 13, an image forming lens 14, and a second polarizing unit 15.

FIG. 1A is a diagram of the imaging apparatus (camera) 10 viewed from the upper side, that is, a top view. As illustrated in a schematic diagram of the imaging apparatus 10 and a photographer 20, along with XYZ coordinate axes, at the lower left of FIG. 1A, a configuration diagram of the imaging apparatus of FIG. 1A is a diagram of the imaging apparatus (camera) 10 viewed from the upper side.

As illustrated by a vertical dotted line (X axis) near the center of FIG. 1A, the upper side of FIG. 1A becomes a right (R) side from the photographer and the lower side of FIG. 1A becomes a left (L) side from the photographer.

The imaging element 16 is a photoelectric conversion element such as a CCD and a CMOS and generates an electrical signal according to object light and outputs the electrical signal to an image processing unit 17.

The image processing unit 17 executes signal processing according to a predetermined algorithm and stores image data as the processing result in a storage unit 18.

The configuration and the processing of the image processing unit 17 will be described in detail below.

In the configuration illustrated in FIG. 1A, the first polarizing unit 12 has a configuration illustrated in FIG. 1B and the second polarizing unit 15 has a configuration illustrated in FIG. 1C.

The first polarizing unit 12 is divided into two portions of left and right portions, as illustrated in FIG. 1B. In the first polarizing unit 12, different polarization regions of a vertical polarization region 12V formed in a region of the left half and a horizontal polarization region 12H formed in a region of the right half are configured. The polarization regions are configured using polarization filters.

The vertical polarization region 12V passes only polarized light of a vertical direction and light that has passed through the vertical polarization region 12V becomes the polarized light of the vertical direction.

The horizontal polarization region 12H passes only polarized light of a horizontal direction and light that has passed through the horizontal polarization region 12H becomes the polarized light of the horizontal direction.

A center of gravity point 31 illustrated in FIG. 1B is a position of a center of gravity of the vertical polarization region 12V. Transmission light of the vertical polarization region 12V corresponds to an image observed using the center of gravity point 31 as a viewing point.

Likewise, a center of gravity point 32 illustrated in FIG. 1B is a position of a center of gravity of the horizontal polarization region 12H. Transmission light of the horizontal polarization region 12H corresponds to an image observed using the center of gravity point 32 as the viewing point.

That is, an image that is observed using the center of gravity point 31, which is the position of the center of gravity of the vertical polarization region 12V, as the viewing point corresponds to a left eye viewing point image (L image) that is an observation image from the left eye and an image that is observed using the center of gravity point 32, which is the position of the center of gravity of the horizontal polarization region 12H, as the viewing point corresponds to a right eye viewing point image (R image) that is an observation image from the right eye.

As such, an image that transmits the first polarizing unit 12 becomes an image that is obtained by transmitting two different left and right viewing point images as vertically polarized light and horizontally polarized light, respectively.

Light of the two different viewing point images, that is, the L image (vertically polarized light) corresponding to the image for the left eye and the R image (horizontally polarized light) corresponding to the image for the right eye, reaches the second polarizing unit 15 through the image forming lens 14.

In the following description, the "image for the right eye" is simply referred to as the "right eye image" and the "image for the left eye" is simply referred to as the "left eye image".

The second polarizing unit 15 has the configuration illustrated in FIG. 1C.

As illustrated in FIG. 1C, the second polarizing unit 15 has a configuration in which three kinds of regions including the horizontal polarization region 15H, the vertical polarization region 15V, and a total transmission (non-polarization) region 15A are repetitively set sequentially from the upper side.

The horizontal polarization region 15H selectively transmits the polarized light of the horizontal direction to cause the imaging element 16 to image only the horizontally polarized light.

The vertical polarization region 15V selectively transmits the polarized light of the vertical direction to cause the imaging element 16 to image only the vertically polarized light.

The total transmission (non-polarization) region 15A transmits both the polarized light of the horizontal direction and the polarized light of the vertical direction to cause the imaging element 16 to image incident light thereof.

Each polarization region that is set to the second polarizing unit 15 is configured using a wire grid polarizer. Each polarization region is a polarizing element that has a configuration in which minute wires (for example, aluminum (Al) lines) are arranged at a small interval and achieves a polarization characteristic according to a wire arrangement direction.

FIG. 2 illustrates a state in which the second polarizing unit 15 and the imaging element 16 receiving the transmission light of the second polarizing unit 15 overlap.

The imaging element 16 is an imaging element that has an RGB arrangement (Bayer arrangement).

A configuration example illustrated in FIG. 2 is an example in which the vertical polarization region 15V and the horizontal polarization region 15H set to the second polarizing unit 15 are set to be adjacent in a unit of two lines of the imaging element and the total transmission (non-polarization) region 15A is set in a unit of twelve lines. That is, three kinds of regions of (a) the vertical polarization region 15V of the two lines, (b) the horizontal polarization region 15H of the two lines, and (c) the total transmission (non-polarization) region 15V of the twelve lines are repetitively set in a vertical direction (Y direction) of the imaging element 16.

The horizontal polarization region 15H selectively transmits the polarized light of the horizontal direction, that is, only the R image (horizontally polarized light) corresponding to the right eye image transmitted through the horizontal polarization region 12H illustrated in FIG. 1B, and causes the imaging element 16 to image the right eye image (R image).

The vertical polarization region 15V selectively transmits the polarized light of the vertical direction, that is, only the L image (vertically polarized light) corresponding to the left eye image transmitted through the vertical polarization region 12V illustrated in FIG. 1B, and causes the imaging element 16 to image the left eye image (L image).

The total transmission (non-polarization) region 15A transmits both the R image (horizontally polarized light) corresponding to the right eye image transmitted through the horizontal polarization region 12H illustrated in FIG. 1B and the L image (vertically polarized light) corresponding to the left eye image transmitted through the vertical polarization region 12V illustrated in FIG. 1B. The images become images that correspond to images viewed from a center point 33, which is a center position of the center of gravity point 31 and the center of gravity point 32 illustrated in FIG. 1B. That is, the images become the same images as normal images photographed by a normal monocular camera that do not have a deviation in the viewing point due to the polarization.

The configuration example illustrated in FIG. 2 is a configuration example of the second polarizing unit 15 and is an example in which the vertical polarization region 15V and the horizontal polarization region 15H are set to be adjacent in a unit of the two lines of the imaging element and the total transmission (non-polarization) region 15A is set in a unit of the twelve lines.

As the configuration of the second polarizing unit 15, other configurations can be used.

Figure 3:
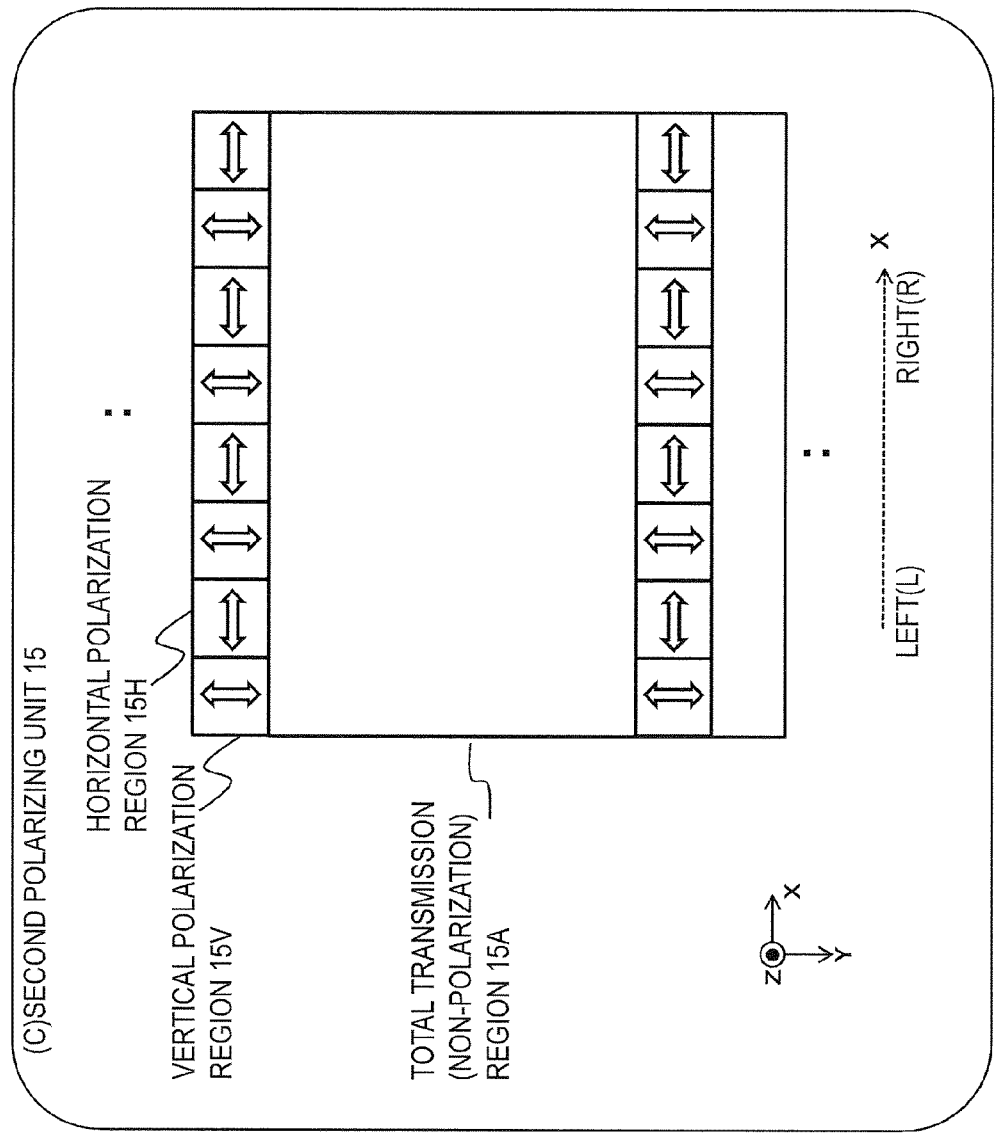
FIG. 3 is a diagram illustrating a configuration example of a second polarizing unit.

For example, as illustrated in FIG. 3, the vertical polarization region 15V and the horizontal polarization region 15H can be set to rectangular regions and can be arranged alternately.

Figure 4:
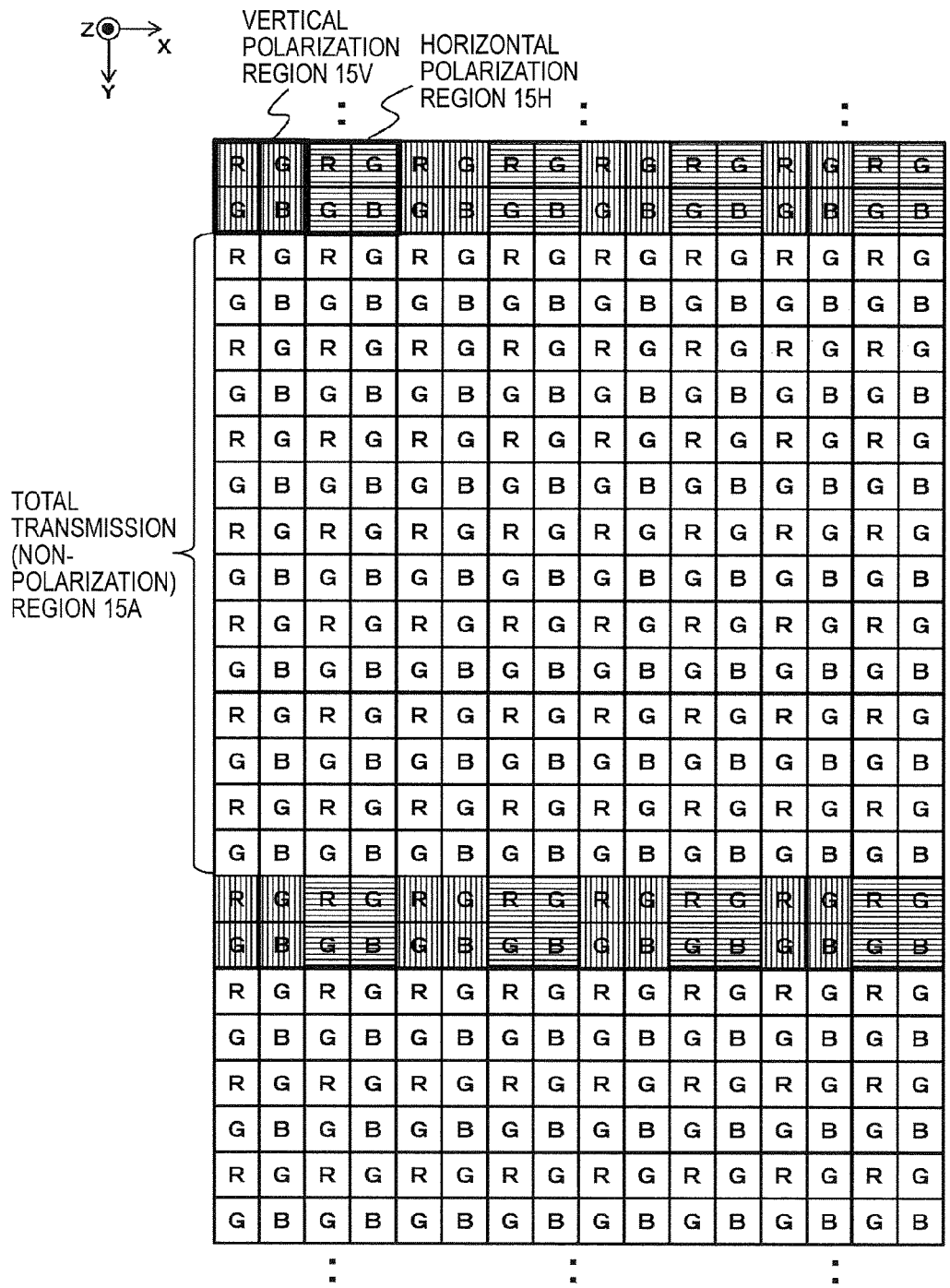
FIG. 4 is a diagram illustrating a configuration example of a second polarizing unit and an imaging element.

FIG. 4 is a diagram illustrating a state in which the second polarizing unit and the imaging element 16 having the RGB arrangement illustrated in FIG. 3 overlap.

An example illustrated in FIG. 4 is a configuration in which regions of two rows where the vertical polarization region 15V and the horizontal polarization region 15H are set are alternately arranged in units of rectangular regions including four pixels of 2×2 and the total transmission (non-polarization) regions 15A of fourteen rows are repetitively arranged in the vertical direction (Y direction).

In this configuration, the horizontal polarization region 15H that is configured using the rectangular region including the four pixels of 2×2 selectively transmits only the polarized light of the horizontal direction, that is, the R image (horizontally polarized light) corresponding to the right eye image transmitted through the horizontal polarization region 12H illustrated in FIG. 1B, and causes the imaging element 16 to image the right eye image (R image).

The vertical polarization region 15V that is configured using the rectangular region including the four pixels of 2×2 selectively transmits only the polarized light of the vertical direction, that is, the L image (vertically polarized light) corresponding to the left eye image transmitted through the vertical polarization region 12V illustrated in FIG. 1B, and causes the imaging element 16 to image the left eye image (L image).

The total transmission (non-polarization) region 15A transmits both the R image (horizontally polarized light) corresponding to the right eye image transmitted through the horizontal polarization region 12H illustrated in FIG. 1B and the L image (vertically polarized light) corresponding to the left eye image transmitted through the vertical polarization region 12V illustrated in FIG. 1B. The images become images that correspond to images viewed from the center point 33, which is the center position of the center of gravity point 31 and the center of gravity point 32 illustrated in FIG. 1B. That is, the images become the same images as normal images observed from the center point 33 that do not have a deviation in the viewing point due to the polarization.

Figure 5:
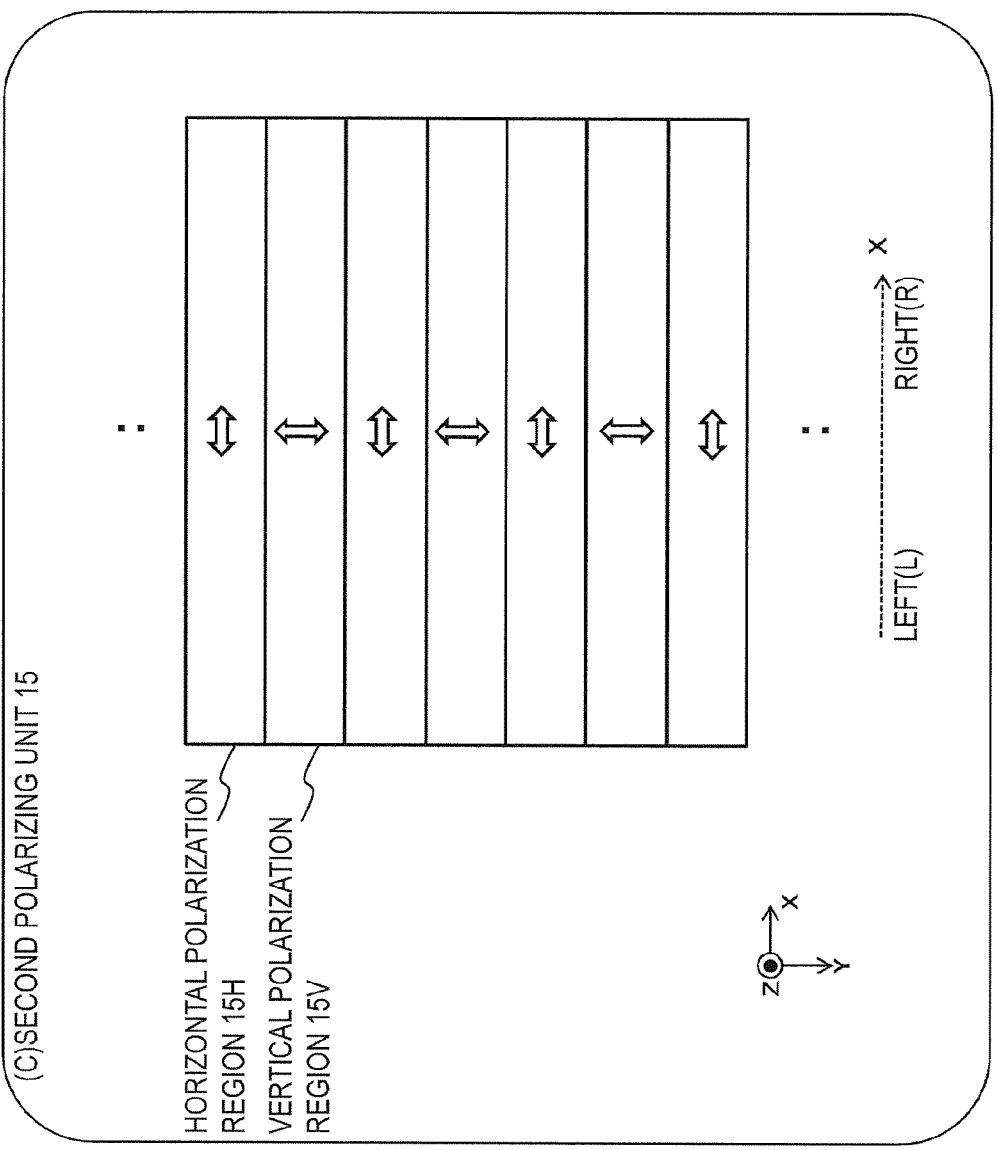
FIG. 5 is a diagram illustrating a configuration example of a second polarizing unit.

As another configuration of the second polarizing unit 15, as illustrated in FIG. 5, each of the horizontal polarization region 15H and the vertical polarization region 15V may be set in units of one row to a plurality of rows without setting the total transmission (non-polarization) region and the horizontal polarization region 15H and the vertical polarization region 15V may be alternately arranged.

Figure 6:
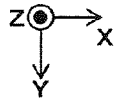
FIG. 6 is a diagram illustrating a configuration example of a second polarizing unit and an imaging element.

FIG. 6 is a diagram illustrating a state in which the second polarizing unit illustrated in FIG. 5 and the imaging element 16 having the RGB arrangement overlap.

In an example illustrated in FIG. 6, each of the horizontal polarization region 15H and the vertical polarization region 15V is set in units of two-row region and the horizontal polarization region 15H and the vertical polarization region 15V are alternately arranged.

That is, the horizontal polarization region 15H and the vertical polarization region 15V that are set in units of two rows are repetitively arranged in the vertical direction (Y direction).

In this configuration, the two-row horizontal polarization region 15H selectively transmits only the polarized light of the horizontal direction, that is, the R image (horizontally polarized light) corresponding to the right eye image transmitted through the horizontal polarization region 12H illustrated in FIG. 1B and causes the imaging element 16 to image the right eye image (R image).

The two-row vertical polarization region 15V selectively transmits only the polarized light of the vertical direction, that is, the L image (vertically polarized light) corresponding to the left eye image transmitted through the vertical polarization region 12V illustrated in FIG. 1B and causes the imaging element 16 to image the left eye image (L image).

In this configuration, because the total transmission (non-polarization) region 15A is not set, the image viewed from the center point 33 that is the center position of the center of gravity point 31 and the center of gravity point 32 illustrated in FIG. 1B is not acquired.

As such, the second polarizing unit 15 can be variously configured. In the image processing unit 17 of the imaging apparatus 10 illustrated in FIG. 1A, different processing is executed according to the configuration of the second polarizing unit 15.

Hereinafter, a plurality of image processing examples according to the configurations of the second polarizing unit 15 will be described.

[2. Image Processing in Application Configuration of Full Grid Type Second Polarizing Unit]

First, the image processing in the application configuration of the full grid type second polarizing unit will be described.

In the full grid type second polarizing unit, a wire grid for polarization is set to the entire second polarizing unit 15 set to a front surface of the imaging element 16 illustrated in FIG. 1A. That is, the second polarizing unit 15 described with reference to FIGS. 5 and 6 is applied.

With respect to all pixel positions of the imaging element, a wire grid for the horizontal polarization or the vertical polarization is set to the second polarizing unit 15. When the full grid type second polarizing unit is used, the total transmission (non-polarization) region is not set.

Therefore, in the configuration in which the full grid type second polarizing unit is applied, only two different viewing point images of the left eye image (L image) and the right eye image (R image) are imaged in the imaging element 16.

In the configuration described with reference to FIGS. 5 and 6, that is, the configuration in which each of the horizontal polarization region 15H and the vertical polarization region 15V is set in units of two rows, each of the right eye image (R image) [=transmission image of the horizontal polarization region 15H] and the left eye image (L image) [=transmission image of the vertical polarization region 15V] is imaged in units of two rows in the imaging element 16.

A configuration and processing of the image processing unit 17 in the configuration in which the full grid type second polarizing unit 15 is applied to the imaging apparatus 10 illustrated in FIG. 1A will be described with reference to FIG. 7.

Figure 7:
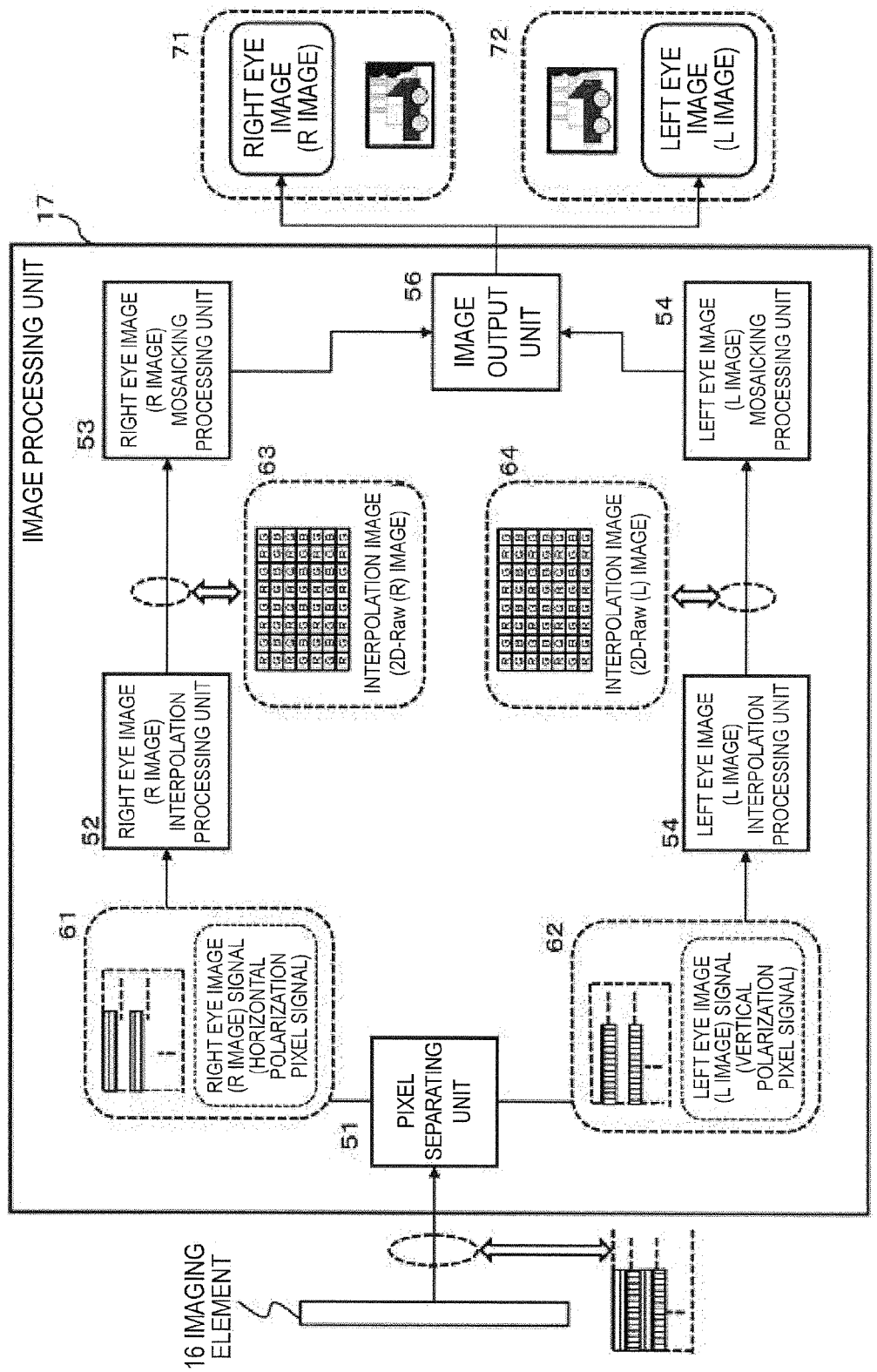
FIG. 7 is a diagram illustrating a configuration example of an image processing unit of an image processing apparatus.

FIG. 7 is a diagram illustrating a detailed configuration of the image processing unit 17 illustrated in FIG. 1.

In the configuration in which the full grid type second polarizing unit 15 is applied, only two viewing point images that correspond to the left eye image (L image) and the right eye image (R image) are imaged in the imaging element 16.

In the following description, pixels that correspond to (a) the vertical polarization region and (b) the horizontal polarization region in the imaging element 16 are referred to as polarized (PL) pixels. Pixels that correspond to the total transmission (non-polarization) region are referred to as non-polarized (N) pixels.

In this embodiment, the full grid type second polarizing unit 15 is applied and an output of the imaging element 16 is configured using only a PL pixel output (=output of the pixels corresponding to the vertical polarization region and the horizontal polarization region).

With respect to a PL pixel signal that is output from the imaging element 16 illustrated in FIG. 7, separation processing for separating the PL pixel signal into two viewing point images of a right eye image (R image) signal 61 [=transmission image signal of the horizontal polarization region 15H] and a left eye image (L image) signal 62 [=transmission image signal of the vertical polarization region 15V] is executed in a pixel separating unit 51 of the image processing unit 17.

That is, as described with reference to FIG. 6, when each of the horizontal polarization region 15H and the vertical polarization region 15V is set in units of two rows, the pixel separating unit 51 executes processing for separating the PL pixel signal into an image signal configured by only the horizontal polarization region 15H set in units of two rows and an image signal configured by only the vertical polarization signal 15V set in units of two rows.

Each of the signals that are separated by the separation processing of the pixel separating unit 51 is input to the following interpolation processing units.

The right eye image (R image) signal 61 that is configured by only the image signal of the horizontal polarization region 15H is input to a right eye image (R image) interpolation processing unit 52.

The left eye image (L image) signal 62 that is configured by only the image signal of the vertical polarization region 15V is input to a left eye image (L image) interpolation processing unit 54.

The right eye image (R image) interpolation processing unit 52 executes interpolation processing for a pixel signal not included in the right eye image (R image) signal 61 input from the pixel separating unit 51, that is, a pixel value of a pixel corresponding to the vertical polarization region 15V, using the image signal of the horizontal polarization region 15H in which the right eye image signal is imaged, generates an interpolation image 63 (2D-Raw (R) image) in which the right eye image (R image) signal is set to all pixels, and outputs the interpolation image 63.

Meanwhile, the left eye image (L image) interpolation processing unit 54 executes interpolation processing for a pixel signal not included in the left eye image (L image) signal 62 input from the pixel separating unit 51, that is, a pixel value of a pixel corresponding to the horizontal polarization region 15H, using the image signal of the vertical polarization region 15V in which the left eye image signal is imaged, generates an interpolation image 64 (2D-Raw (L) image) in which the left eye image (L image) signal is set to all pixels, and outputs the interpolation image 64.

The Raw image is an image in which information on one color, for example, color information of any one of R, G, and B, is set to a pixel position. The color is a color that is determined by setting of a color filter set to the imaging element.

Demosaicking processing of a following step, that is, demosaicking processing for setting all pixel values (for example, pixel values of the R, G, and B) to the pixel positions, is executed for the Raw image and a color image that can be output to a display apparatus is generated.

Figure 8:
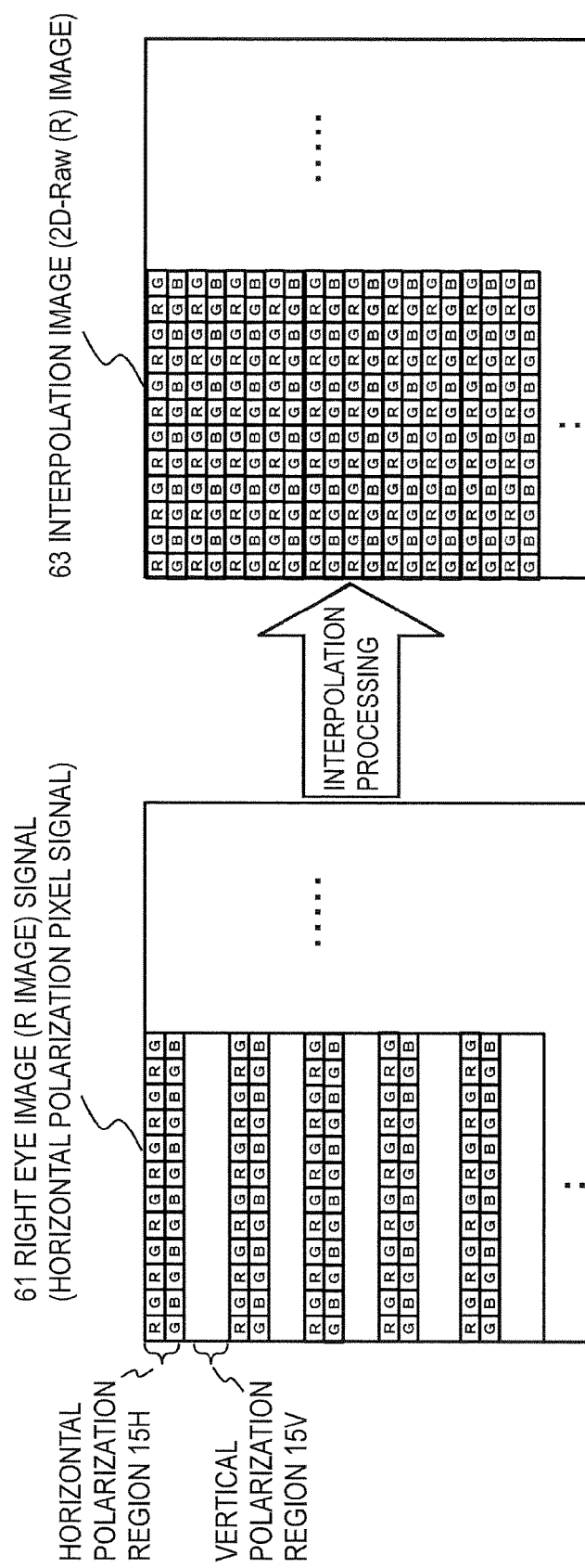
FIG. 8A is a diagram illustrating a first part of a processing example of a right eye image interpolation processing unit.
FIG. 8B is a diagram illustrating a second part of a processing example of a right eye image interpolation processing unit.

An example of the interpolation processing that is executed by the right eye image (R) image interpolation processing unit 52 will be described with reference to FIGS. 8A and 8B. FIGS. 8A and 8B illustrates the right eye image (R image) signal 61 input from the pixel separating unit 51 and the interpolation image 63 (2D-Raw (R) image) generated by the right eye image (R image) interpolation processing unit 52, respectively.

As illustrated in FIG. 8A, the right eye image (R image) signal 61 that is input from the pixel separating unit 51 is configured by only the right eye image signal corresponding to the image signal of the horizontal polarization region 15H and a pixel value of a pixel corresponding to the vertical polarization region 15V is not set.

The right eye image (R image) interpolation processing unit 52 sets the pixel value of the pixel corresponding to the vertical polarization region 15V in which the pixel value is not set, by the interpolation processing.

That is, the right eye image (R image) interpolation processing unit 52 executes the interpolation processing of the transmission image signal of the horizontal polarization region 15H in which the right eye image is imaged, generates the interpolation image 63 (2D-raw (R) image) illustrated in FIG. 8B in which the right eye image (R image) signal is set to all of the pixels, and outputs the interpolation image 63.

Specifically, the right eye image (R image) interpolation processing unit 52 calculates a pixel value of the pixel region in which the pixel value is not set by executing linear interpolation processing to which a pixel value of a pixel in a vertical direction is applied, and sets the pixel value.

When the interpolation processing is executed, the right eye image (R image) interpolation processing unit 52 may execute direction selection type interpolation processing for greatly setting the weight of a pixel value of a pixel in a direction in which a change rate is small, in consideration of a change rate of each direction of the pixel value, that is, an edge direction.

The interpolation image 63 (2D-Raw (R) image) that is generated by the right eye image (R image) interpolation processing unit 52 becomes a Raw image a photographed using the center of gravity point 32 of a right semicircle of the first polarizing unit 12 illustrated in FIG. 1B, that is, a center of gravity position of the horizontal polarization region 12H as a viewing point position, that is, a Raw image corresponding to the right eye image (R image) viewed from a right viewing point.

Meanwhile, the left eye image (L image) interpolation processing unit 54 illustrated in FIG. 7 executes interpolation processing for a pixel signal not included in the left eye image (L image) signal 62 input from the pixel separating unit 51, using the image signal of the vertical polarization region 15V in which the left eye image signal is imaged, generates the interpolation image 64 (2D-Raw (L) image) in which the left eye image (L image) signal is set to all pixels, and outputs the interpolation image 64.

The interpolation image 64 (2D-Raw (L) image) becomes a Raw image photographed using the center of gravity point 31 of a left semicircle of the first polarizing unit 12 illustrated in FIG. 1B, that is, a center of gravity position of the vertical polarization region 12V, as a viewing point position, that is, a Raw image corresponding to the left eye image (L image) viewed from a left viewing point.

The Raw images corresponding to the two viewing points that include the interpolation image 63 (2D-Raw (R) image) corresponding to the right eye image (R image) and the interpolation image 64 (2D-Raw (L) image) corresponding to the left eye image (L image) are generated by the interpolation processing of the two interpolation processing units, that is, the interpolation processing including the interpolation processing of the right eye image (R image) interpolation processing unit 52 and the interpolation processing of the left eye image (L image) interpolation processing unit 54.

The two Raw images are two-dimensional (2D) Raw images in which pixel values are set to all pixel positions of the imaging element 16.

The interpolation images (2D-Raw images) 63 and 64 that are generated by the interpolation processing units 52 and 54 are input to the demosaicking processing units 53 and 54, respectively.

The interpolation image 63 (2D-Raw (R) image) that is generated by the right eye image (R image) interpolation processing unit 52 is input to the demosaicking processing unit 53.

The interpolation image 64 (2D-Raw (L) image) that is generated by the left eye image (L image) interpolation processing unit 54 is input to the demosaicking processing unit 54.

The demosaicking processing unit 53 executes demosaicking processing for the interpolation image (2D-Raw (R) image) 63 corresponding to the right eye image observed from the right viewing point and other camera signal processing and generates a two-dimensional image that can be output to a display unit and corresponds to an image observed from the right viewing point.

As described above, the demosaicking processing is processing for setting all color signals, for example, pixel values of colors of R, G, and B, to all pixel positions and is processing executed in a general camera.

Meanwhile, the demosaicking processing unit 54 executes demosaicking processing for the interpolation image (2D-Raw (L) image) 64 corresponding to the left eye image observed from the left viewing point and other camera signal processing and generates a two-dimensional image that can be output to the display unit and corresponds to an image observed from the left viewing point.

The images from the two different viewing points that are generated by the demosaicking processing units 53 and 54 are output as images from two different viewing points to be applied to the three-dimensional (3D) image display, that is, a left eye image (L image) 71 and a right eye image (R image) 72, through an image output unit 56.

As described above, the image processing unit 17 illustrated in FIG. 7 acquires images from different viewing points to be acquired in units of pixels according to a polarizer arranged on the imaging element 16, that is, a right eye image and a left eye image.

A left eye image in which pixel values corresponding to an image observed from a left viewing point are set to all pixel positions and a right eye image in which pixel values corresponding to an image observed from a right viewing point are set to all pixel positions are generated by interpolation processing based on the images.

By the processing, high-definition left and right eye images that are applied to the 3D image display are output on the basis of one photographed image.

In the embodiment described above, the first polarizing unit 12 described with reference to FIGS. 1A to 1C has the configuration in which the horizontal polarization region is set to the right side and the vertical polarization region is set to the left side. However, the inverse setting may be performed.

In addition to the combination of the horizontal polarization and the vertical polarization, any combination of polarization regions having two different polarization directions such as polarization regions transmitting polarized light of an oblique direction may be applied.

The second polarizing unit 15 should set polarization regions having the same combination as the polarization regions set to the first polarizing unit 12, to correspond to setting of the polarization regions of the first polarizing unit 12.

[3. Image Processing in Application Configuration of Interpolation Grid Type Second Polarizing Unit]

Next, the image processing in the application configuration of the interpolation grid type second polarizing unit will be described.

In the interpolation grid type second polarizing unit, a wire grid for polarization is set to a part of the second polarizing unit 15 set to the front surface of the imaging element 16 illustrated in FIG. 1A. That is, the horizontal polarization region 15H and the vertical polarization region 15V are set and the total transmission (non-polarization) region 15A in which a wire grid functioning as a polarizing element is not set is set.

Specifically, as described with reference to FIGS. 1C and 2, the horizontal polarization region 15H and the vertical polarization region 15V are set in units of rows and the total transmission (non-polarization) region 15A in which the wire grid functioning as the polarizing element is not set is set.

As described with reference to FIGS. 3 and 4, the rectangular horizontal polarization region 15H and vertical polarization region 15V are set and the total transmission (non-polarization) region 15A in which the wire grid functioning as the polarizing element is not set is set.

As the configuration of the interpolation grid type second polarizing unit, configurations other than the configurations of FIGS. 1C, 2, 3, and 4 can be set.

A polarizing unit that has a polarization region and a non-polarization region is defined as the interpolation grid type polarizing unit.

That is, the interpolation grid type second polarizing unit 15 is divided into three kinds of regions of (a) a vertical polarization region, (b) a horizontal polarization region, and (c) a total transmission (non-polarization) region and inputs signals corresponding to the three kinds of regions to the image processing unit 17.

In the following description, the pixels corresponding to (a) the vertical polarization regions and (b) the horizontal polarization regions in the imaging element 16 are referred to as polarization (PL) pixels. The pixels corresponding to (c) the total polarization (non-polarization) regions are referred to as non-polarization (N) pixels.

An output of the imaging element 16 includes a PL pixel output (=output of the pixels corresponding to the vertical polarization region and the horizontal polarization region) and an N pixel output (=output of the pixels corresponding to the total transmission (non-polarization) region).

In this case, a processing example when the PL pixel output and the N pixel output are output from the imaging element 16 having the combination configuration of the second polarizing unit 15 and the imaging element 16 described with reference to FIGS. 3 and 4 to the image processing unit 17 will be described.

That is, the imaging element 16 has a configuration in which regions of two rows where the vertical polarization region 15V and the horizontal polarization region 15H are alternately arranged in units of rectangular regions including four pixels of 2×2 and the total transmission (non-polarization) regions 15A of fourteen rows are repetitively arranged in the vertical direction (Y direction), as described with reference to FIG. 4.

The configuration and processing of the image processing unit 17 when the interpolation grid type second polarizing unit 15 is applied to the imaging apparatus 10 illustrated in FIG. 1A will be described with reference to FIG. 9.

Figure 9:
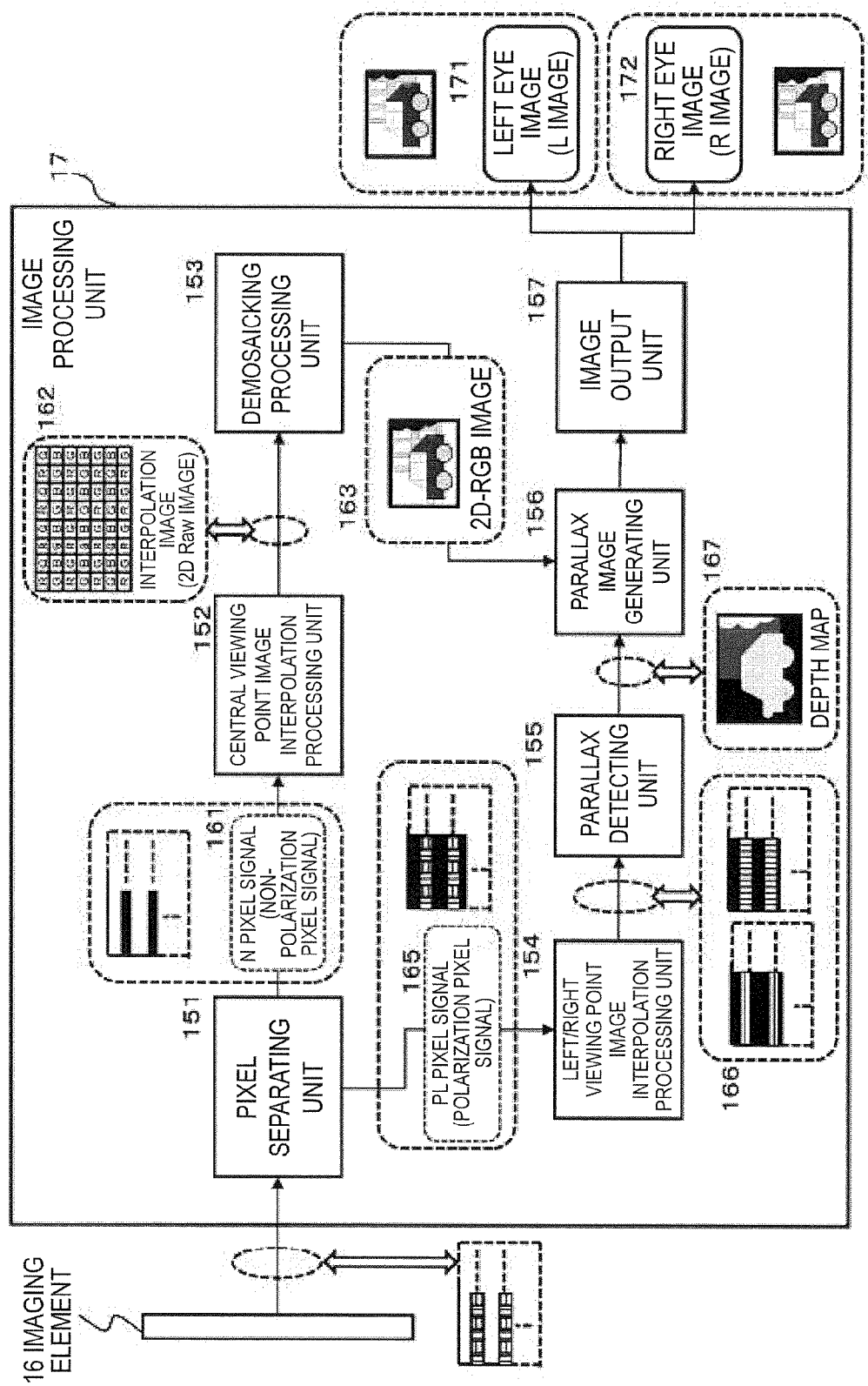
FIG. 9 is a diagram illustrating a configuration example of an image processing unit of an image processing apparatus.

FIG. 9 is a diagram illustrating a detailed configuration of the image processing unit 17 illustrated in FIG. 1.

In this embodiment, a signal that is output from the imaging element 16 illustrated in FIG. 9 includes three kinds of pixel signals of a pixel signal (=polarization region pixel (PL pixel) signal) of the vertical polarization region 15V including four pixels of 2×2, a pixel signal (=polarization region pixel (PL pixel) signal) of the horizontal polarization region 15H including four pixels of 2×2, and a pixel signal (=non-polarization region pixel (N pixel) signal) of the total transmission (non-polarization) region 15A.

With respect to a signal output from the imaging element 16, separation processing for separating the signal into two outputs of the polarization region pixel (PL pixel) and the non-polarization region pixel (N pixel) is executed in the pixel separating unit 151 of the image processing unit 17.

An N pixel signal (non-polarization pixel signal) 161 that is separated by the separation processing of the polarization pixel separating unit 151 is input to a central viewing point image interpolation processing unit 152.

The central viewing point image interpolation processing unit 152 executes pixel interpolation processing for a pixel region missed from the N pixel signal (non-polarization pixel signal) 161, that is, the pixels of the PL pixel region. Specifically, the image correcting unit 152 executes interpolation processing for calculating a pixel value of the PL pixel region with reference to pixel values of the upper and lower N pixels and setting the pixel value.

An interpolation image (2D-Raw image) 162 that has the same pixel number as the input image is generated by setting the pixel values of all of the PL pixel regions of which the pixel values are missing, by the pixel interpolation processing. The interpolation image (2D-Raw image) 162 is an image in which a pixel value of any one of RGB is set to each pixel.

The interpolation image (2D-Raw image) 162 that is generated by the central viewing point image interpolation processing unit 152 becomes an image in which N pixel signals (non-polarization pixel signals) are set to all of the pixels forming the imaging element 16. The image is one two-dimensional (2D) Raw image that corresponds to an image observed from the center point 33 of the first polarizing unit 12 illustrated in FIG. 1B.

The interpolation image (2D-Raw image) 162 that is generated by the central viewing point image interpolation processing unit 152 is input to a demosaicking processing unit 153.

The demosaicking processing unit 153 executes demosaicking processing and other camera signal processing for the interpolation image (2D-Raw image) 162 and converts the interpolation image into a normal 2D image.

The demosaicking processing is processing for setting all color signals, for example, pixel values of individual colors of RGB, to all pixel positions and is processing executed in a general camera.

The 2D-RGB image 163 that is generated by the demosaicking processing unit 153 is input to a parallax image generating unit 156.

Meanwhile, the PL pixel signal (polarization pixel signal) 165 that is one separation signal to be generated by the separation processing of the polarization pixel separating unit 151 becomes a pixel signal having only a pixel value of the polarization region pixel (PL pixel), rather than the pixel value of the non-polarization region pixel (N pixel).

The PL pixel signal (polarization pixel signal) 165 is input to a left/right viewing point image interpolation processing unit 154.

The processing example described above is a configuration in which the regions of the two rows where the vertical polarization region 15V and the horizontal polarization region 15H are alternately arranged in units of rectangular regions including the four pixels of 2×2 and the total transmission (non-polarization) regions 15A of the fourteen rows are repetitively arranged in the vertical direction (Y direction), as described with reference to FIG. 4.

Therefore, the PL pixel signal (polarization pixel signal) 165 that is generated by the separation processing of the polarization pixel separating unit 151 becomes an image in which the regions of the two rows where the vertical polarization region 15V and the horizontal polarization region 15H are alternately arranged in units of rectangular regions including the four pixels of 2×2 are set in the vertical direction, for every 14 rows.

The left/right viewing point image interpolation processing unit 154 selects only the regions (PL pixel regions) of the two rows where the vertical polarization region 15V and the horizontal polarization region 15H are alternately arranged in units of rectangular regions including the four pixels of 2×2 as processing objects and generates a parallax image to generate a depth map 167 in a parallax detecting unit 155 of a next step, that is, a parallax image 166 of a left eye image signal (vertical polarization image signal) corresponding to an image observed from a left eye viewing point and a right eye image signal (horizontal polarization image signal) corresponding to an image observed from a right eye viewing point, using the selected PL pixel.

An example of processing for generating a parallax image in the left/right viewing point image interpolation processing unit 154 will be described with reference to FIG. 10.

As illustrated in FIG. 10, the left/right viewing point image interpolation processing unit 154 generates each image of a left eye image signal (vertical polarization image signal) 166a in which pixel values corresponding to the vertical polarization region 15V are set to all the pixels and a right eye image signal (horizontal polarization image signal) 166b in which pixel values corresponding to the horizontal polarization region 15H are set to all the pixels, with respect to the PL pixel region included in the PL pixel signal (polarization pixel signal) 165.

The left eye image signal (vertical polarization image signal) 166a illustrated in FIG. 10 is generated by pixel value interpolation processing for resetting (removing) a pixel value of the horizontal polarization pixel region of the PL pixel region included in the PL pixel signal (polarization pixel signal) 165 and setting the pixel value of the reset pixel using the pixel values of the peripheral vertical polarization pixels.

Likewise, the right eye image signal (horizontal polarization image signal) 166b illustrated in FIG. 10 is generated by pixel value interpolation processing for resetting (removing) a pixel value of the horizontal polarization pixel region of the PL pixel region included in the PL pixel signal (polarization pixel signal) 165 and setting the pixel value of the reset pixel using the pixel values of the peripheral horizontal polarization pixels.

As a result, the image to which the pixel value included in the left eye image signal (vertical polarization image signal) 166a is set becomes an image viewed from the left center of gravity point 31 of the first polarizing unit 12 illustrated in FIG. 1B, that is, an image corresponding to the left eye image.

Likewise, the image to which the pixel value included in the right eye image signal (horizontal polarization image signal) 166b is set becomes an image viewed from the right center of gravity point 32 of the first polarizing unit 12 illustrated in FIG. 1B, that is, an image corresponding to the right eye image.

As such, the left/right viewing point image interpolation processing unit 154 interpolates information missing in a horizontal direction of each of the left eye image and the right eye image with respect to the PL pixel region included in the PL pixel signal (polarization pixel signal) 165 and generates the left eye image signal (vertical polarization image signal) 166a and the right eye image signal (horizontal polarization image signal) 166b that have the same horizontal pixel number as the input image.

The image that is generated by the left/right viewing point image interpolation processing unit 154 is input to the parallax detecting unit 155.

The parallax detecting unit 155 compares corresponding pixels using block matching processing with respect to the two images of the left eye image signal (vertical polarization image signal) 166a and the right eye image signal (horizontal polarization image signal) 166b having the same horizontal pixel number as the input image and illustrated in FIG. 10, calculates an object deviation amount, and detects the object distance as parallax information.

That is, the parallax detecting unit 155 detects the deviation between the pixels of the left eye image and the right eye image by the block matching processing and calculates the object distance according to the deviation amount.

The parallax detecting unit 155 generates a depth map 167 having the object distance information corresponding to each pixel and outputs the depth map.

The depth map 167 is data that has the object distance information with respect to each of the pixels forming the image. For example, the depth map 67 is configured as an image to which a brightness value according to the object distance is set.

Specifically, a region having the short object distance (close to the camera) has high brightness and a region having the long object distance (far from the camera) has low brightness. The parallax detecting unit 155 generates the depth map to which the pixel value is set and outputs the depth map to the parallax image generating unit 156.

The images of the left eye image signal (vertical polarization image signal) 166a and the right eye image signal (horizontal polarization image signal) 166b that are generated by the left/right viewing point image interpolation processing unit 154 do not have an image signal with respect to the N pixel (non-polarization pixel) region of the input image, as illustrated in FIG. 10. However, the parallax detecting unit 155 calculates the left eye image to which an interpolation pixel value based on the left eye image signal (vertical polarization image signal) 166a is set and the right eye image to which the interpolation pixel value based on the right eye image signal (horizontal polarization image signal) 166b is set with respect to the N pixel (non-polarization pixel) not having the pixel value, and calculates the distance information corresponding to all of the pixels by the matching processing between the images.

As the pixel value interpolation processing, linear interpolation processing can be used.

A parallax image (LR image) that is generated by the left/right viewing point image interpolation processing unit 154 is only used to generate the depth map 167 in the parallax detecting unit 155 of the next step and the parallax of the PL pixel region may be obtained.

The images from the viewing points illustrated in FIG. 10, that is, images of the left eye image signal (vertical polarization image signal) 166a and the right eye image signal (horizontal polarization image signal) 166b become images in which each signal of R, G, and B is set. However, the L image and the R image may be generated as the parallax images using only the G pixels included in the PL pixel signal (polarization pixel signal) 165 output by the pixel separating unit 151.

An example of processing for generating the parallax image using only the G pixels will be described with reference to FIGS. 11A and 11B.

Figure 11A:
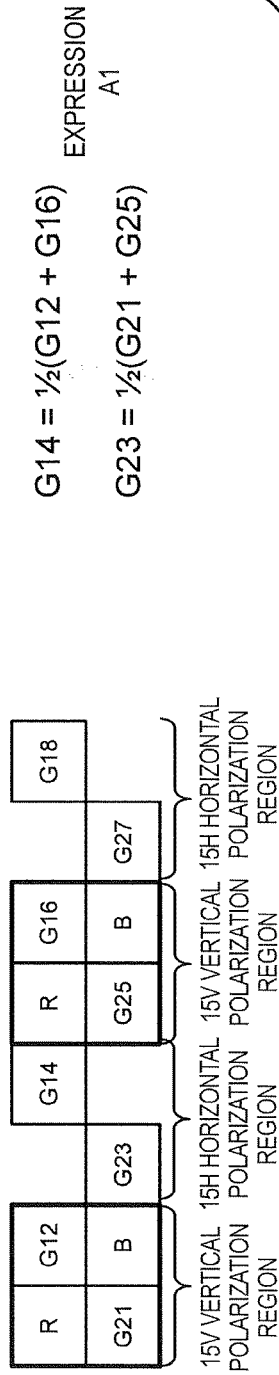
FIG. 11A is a diagram illustrating a first step of a processing example of a left/right viewing point image interpolation processing unit.
Figure 11B:
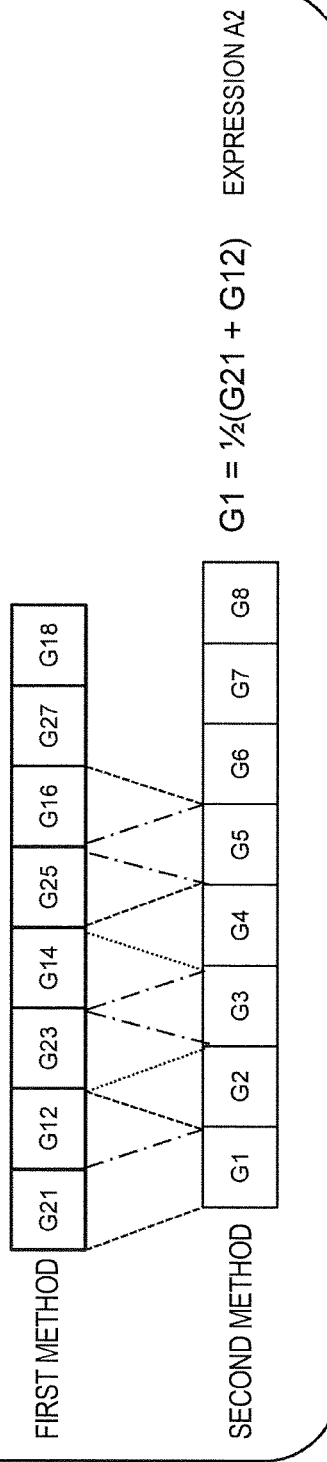
FIG. 11B is a diagram illustrating a second step of a processing example of a left/right viewing point image interpolation processing unit.

The processing for generating the parallax image using only the G pixels includes two interpolation processing steps illustrated in FIGS. 11A and 11B that are (a) an interpolation processing step 1=G pixel interpolation processing in the polarization region and (b) an interpolation processing step 2=processing for setting a G pixel line (row) of a horizontal direction, respectively.

FIG. 11A illustrates processing of (a) the interpolation processing step 1=G pixel interpolation processing in the polarization region.

FIGS. 11A and 11B illustrate an example of processing for generating a left eye image signal (vertical polarization image signal). That is, the processing is processing for setting the G pixel corresponding to the left eye image signal to the total pixel region of the imaging element 16 on the basis of the left eye image signal (vertical polarization image signal) included in the PL pixel signal 165 generated by the pixel separating unit 151.

As described above with reference to FIGS. 3 and 4, the vertical polarization region 15V to be the left eye image signal and the horizontal polarization region 15H to be the right eye image signal are repetitively set as the 2×2 pixel regions.

FIG. 11A illustrates only the two rows of the polarization regions and illustrates a pixel region in which the vertical polarization region 15V corresponding to the left eye image signal of 2×2 pixels and the horizontal polarization region 15H corresponding to the right eye image signal of 2×2 pixels are alternately set.

First, the pixel value of the horizontal polarization region 15H corresponding to the right eye image is erased and an interpolation pixel value based on the pixel value of the G pixel in the vertical polarization region 15V corresponding to the left eye image signal is set.

For example, G14 and G23 illustrated in FIG. 11A are the G pixels that are generated by the interpolation processing.

The pixel value G14 of G14 is calculated as in the following equation using pixel values (G12 and G16) of G pixels most adjacent to the G pixel in the two vertical polarization regions 15V corresponding to the left eye image signals at the left and right sides of the same row.

$$G14=(1/2)(G12+G16)$$

Likewise, a pixel value G23 of G23 is calculated as in the following equation using pixel values (G21 and G25) of G pixels most adjacent to the G pixel in the two vertical polarization regions 15V at the left and right sides of the same row.

$$G23=(1/2)(G21+G25)$$

As such, when the left eye image is generated, linear interpolation processing based on the G pixel values of the left and right vertical polarization regions 15V corresponding to the left eye images is executed for the G pixel setting position of the horizontal polarization region 15H corresponding to the right eye image.

By the processing, a pixel value of one G pixel corresponding to the left eye image is set to each column of the polarization pixel region of the two rows.

Processing for setting one G pixel set to each column to a line of one row is processing illustrated in FIG. 11B. That is, the processing is (b) an interpolation processing step 2=processing for setting a G pixel line (row) of a horizontal direction.

FIG. 11B illustrates two methods (first and second methods) as an example of the processing of the interpolation processing step 2.

(b1) The first method is processing for arranging one G pixel value set to each column in the step 1 illustrated in FIG. 11A on one row.

The polarization region is set in units of two rows. However, the polarization region may be set as a G pixel line of one row for vertical two rows.

(b2) The second method is processing for calculating one new G pixel value using two adjacent G pixel values of one G pixel value set to each column in the step 1 illustrated in FIG. 11A and setting a G pixel line of one row.

For example, as illustrated in FIG. 11B, a pixel value G1 of the new G pixel illustrated in (b2) is calculated as in an equation G1=(1/2)(G21+G12).

Likewise, pixel values G2, G3, G4, ... are calculated using the two adjacent G pixel values set in step S1 illustrated in FIG. 11A.

By the interpolation processing step S2 of executing any one of the first method and the second method, in the pixels of the row corresponding to the polarization region, setting of the G pixels corresponding to the left eye viewing point image is completed.

FIGS. 11A and 11B illustrate the example of the processing for generating the left eye image signal (vertical polarization image signal). However, the processing for generating the right eye image signal (horizontal polarization image signal) may include executing the interpolation processing setting the vertical polarization region 15V as the interpolation object region using the right eye image signal (horizontal polarization image signal). By the interpolation processing, the G pixel corresponding to the right eye viewing point image may be set to each row of the polarization region.

As such, the left/right viewing point image interpolation processing unit 154 may generate two interpolation images of an interpolation image in which the G pixel value of the left eye image is set to the polarization region and an interpolation image in which the G pixel value of the right eye image is set to the polarization region and provide the two interpolation images to the parallax detecting unit 156.

The parallax detecting unit 155 inputs the two interpolation images as the parallax image including only the G pixels and generates the depth map 167.

This processing will be described with reference to FIG. 12.

The interpolation images that are generated in the interpolation image generation processing executed by the left/right eye interpolation processing unit 154 described with reference to FIGS. 11A and 11B are an interpolation image in which the G pixel value of the left eye image is set to the polarization region and an interpolation image in which the G pixel value of the left eye image is set to the polarization region.

The parallax detecting unit 155 calculates the parallax corresponding to each pixel of the polarization region by applying the interpolation images and calculates the object distance (D: depth) corresponding to the parallax.

Next, depth interpolation processing for estimating the depth of the non-polarization region is executed using depth information of only the polarization regions. FIG. 12 is a diagram illustrating an example of the depth information interpolation processing.

As illustrated in FIG. 12, the depth corresponding to each pixel of the non-polarization region is calculated using the depths D1 and D2 set to the polarization regions and is set.

In the example of FIG. 12, the polarization region is set to one row and the non-polarization region is set to seven rows to simplify the description. Each of D1 and D2 is depth information corresponding to the pixel of the polarization region with respect to any column.

D1 and D2 are depth information that is calculated by the interpolation images that include the interpolation image in which the G pixel value of the left eye image is set to the polarization region and the interpolation image in which the G pixel value of the right eye image is set to the polarization region, which are generated by the left/right eye interpolation processing unit 154.

The parallax calculating unit 155 estimates the depth corresponding to each pixel of the non-polarization region on the basis of the depth information, and sets the depth. FIG. 12 illustrates an example of processing for calculating nine depth information (D'1 to D'9) of the same column calculated on the basis of the depths D2 and D2 corresponding to the two pixels of the polarization region on any column Specifically, the parallax calculating unit 155 executes the following calculation processing.

$$D'1=D1$$

$$D'2=(7/8)D1+(1/8)D2$$

$$D'3=(6/8)D1+(2/8)D2$$

$$\vdots$$

$$D'8=(1/8)D1+(7/8)D2$$

$$D'9=D2$$

As such, the parallax detecting unit 155 executes enlargement processing using the depths D1 and D2, sets the weights according to the distances from the depths D1 and D2, and generates a depth map in which the depth of each pixel is estimated.

The depth map 167 that is generated as described above is provided to the parallax image generating unit 156.

In the example of FIG. 12, the polarization region is set to one row and the non-polarization region is set to seven rows to simplify the description and the enlargement processing is executed. However, as described with reference to FIG. 10, when the polarization region is set to two rows, the depth map of one row is generated with respect to the polarization region, as described above with reference to FIGS. 11A and 11B. Because the depth map virtually becomes a depth map of a center row with respect to two rows of the polarization region, the weights according to the distances are set to the two rows of the polarization region and the k rows of the non-polarization region and a depth map in which the depth of each pixel is estimated is generated, similar to the description of FIG. 12.

As described above, various processing can be applied as interpolation image generation processing for the parallax information calculation in the left/right viewing point image interpolation processing unit 154 and generation processing of the depth map 167 in the parallax detecting unit 155.

Next, processing that is executed in the parallax image generating unit 156 will be described.

The parallax image generating unit 156 generates two images of a left eye image (L image) 171 and a right eye image (R image) 172, using the 2D-RGB image 163 to be the two-dimensional image output from the demosaicking processing unit 153 and the depth map 167 corresponding to the parallax information output from the parallax detecting unit 155.

That is, the parallax image generating unit 156 executes image conversion processing for setting the parallax according to the object distance with respect to the 2D-RGB image 163 on the basis of the depth map 167 corresponding to the parallax information, generates the left eye image (L image) 171 and the right eye image (R image) 172, and outputs the left eye image and the right eye image.

The image conversion processing that is executed in the parallax image generating unit 156 is processing for generating the left eye image (L image) 171 and the right eye image (R image) applicable to the three-dimensional image display by the image conversion based on one two-dimensional image (2D image) and outputting the left eye image and the right eye image, and is generally referred to as 2D3D conversion processing.

An example of the 2D3D conversion processing that is executed in the parallax image generating unit 156 will be described below. As the 2D3D conversion processing, various processing is suggested. Processing of the parallax image generating unit 156 is not limited to processing to be described below and the parallax image generating unit 156 may execute 2D3D conversion processing to which other existing methods are applied.

One specific example of the 2D3D conversion processing that is executed in the parallax image generating unit 156 will be described.

The parallax image generating unit 156 generates a right eye image and a left eye image applicable to the three-dimensional image display from one image input from the demosaicking processing unit 153, that is, the 2D-RGB image 163, by the 2D3D conversion processing using the depth map 167.

The parallax image generating unit 156 generates a right eye image and a left eye image in which the parallax (shift amount) according to the object distance information of a pixel region unit obtained from the depth map is set and outputs the right eye image and the left eye image through the image output unit 157.

Figure 13:
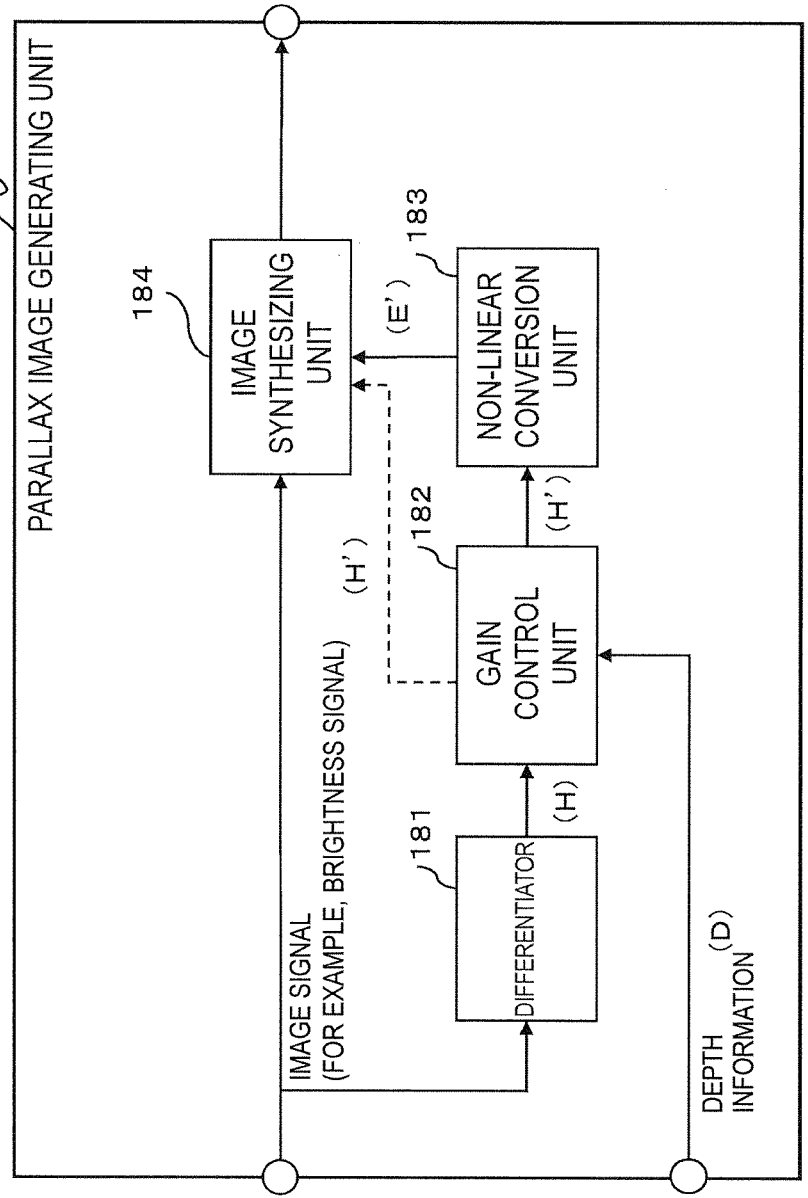
FIG. 13 is a diagram illustrating a configuration example of a parallel image generating unit.

FIG. 13 is a block diagram illustrating a configuration of an embodiment of the parallax image generating unit 156.

The parallax image generating unit 156 executes processing for extracting a spatial feature amount of an input image signal and generating a new viewing point image by executing different emphasis processing for the extracted feature amount. The parallax image generating unit 156 includes a differentiator 181, a gain control unit 182, a non-linear conversion unit 183, and an image synthesizing unit 184.

The differentiator 181 extracts a brightness signal from video data input to the parallax image generating unit 156 and generates a differential signal (H) with respect to the brightness signal. Specifically, the differentiator 181 inputs a brightness signal of an image in a horizontal direction and generates a signal obtained by executing linear differentiating for the input brightness signal. The linear differentiating processing is executed using a linear differentiating filter of three horizontal direction taps.

In the embodiment, the brightness signal is used as processing data. However, instead of the brightness signal, a color signal (RGB) may be used as the processing data.

The gain control unit 182 multiplies the differential signal (H) output from the differentiator 181 by a coefficient (gain efficient) according to a predetermined rule, controls an amplitude value of a differential signal, and generates a corrected differential signal (H') to be a correction signal of the differential signal.

The non-linear conversion unit 183 converts the corrected differential signal (H') output from the gain control unit 182 in a non-linear manner and outputs the differential signal as a parallax emphasis signal (E') to the image synthesizing unit 184.

The image synthesizing unit 184 executes processing for generating a new viewing point image by applying each frame image forming the video data corresponding to the processing object image and the spatial feature amount generated from the frame image, that is, the corrected differential signal (H') of the brightness signal or the viewing point emphasis signal (E') generated by converting the corrected differential signal in the non-linear manner.

As illustrated by a dotted line in FIG. 13, the conversion processing of the non-linear conversion unit 183 may be omitted, the corrected differential signal (H') that is corrected by the gain control unit 182 may be input directly to the image synthesizing unit 184, and the image synthesizing unit 184 may apply the corrected differential signal and generate a new viewing point image.

Next, processing that is executed by the gain control unit 182 will be described.

Figure 14:
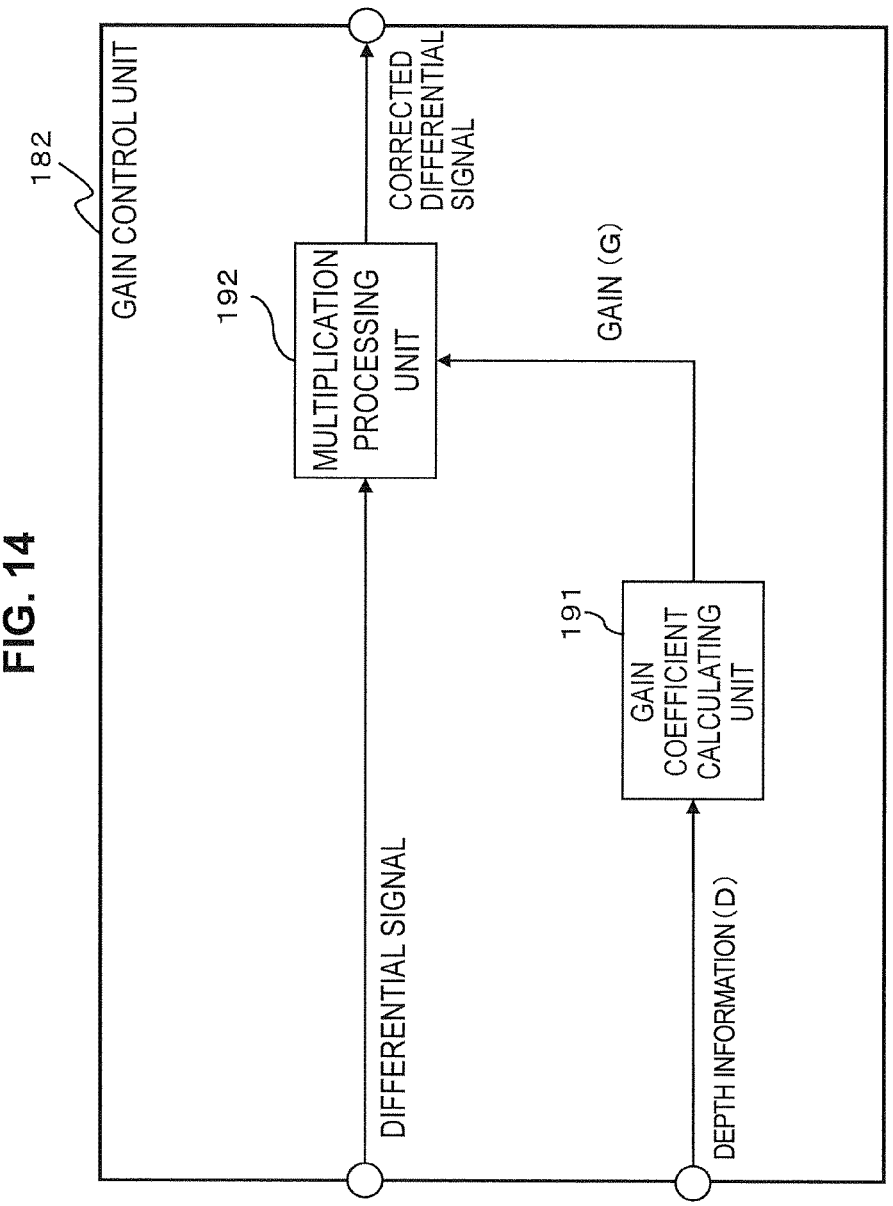
FIG. 14 is a block diagram illustrating a configuration of an embodiment of a gain control unit.

FIG. 14 is a block diagram illustrating a configuration of an embodiment of the gain control unit 182. The gain control unit 182 controls an amplitude value of the input differential signal on the basis of depth information input in the same manner. In the embodiment to be described below, the depth information is input in a form of a depth map that has one depth value for each pixel of the input differential signal. The depth information is information that is acquired from the depth map 167 generated by the parallax detecting unit 155.

A gain coefficient calculating unit 191 outputs a gain coefficient with respect to the corresponding pixel using the input depth information with respect to each pixel.

A multiplication processing unit 192 executes multiplication processing for multiplying a gain coefficient for each pixel output from the gain coefficient calculating unit 191 with the amplitude value of the differential signal (H), for each pixel of the input differential signal. As a result, the multiplication processing unit 192 outputs the corrected differential signal (H') in which the amplitude value is gain controlled.

Figure 15:
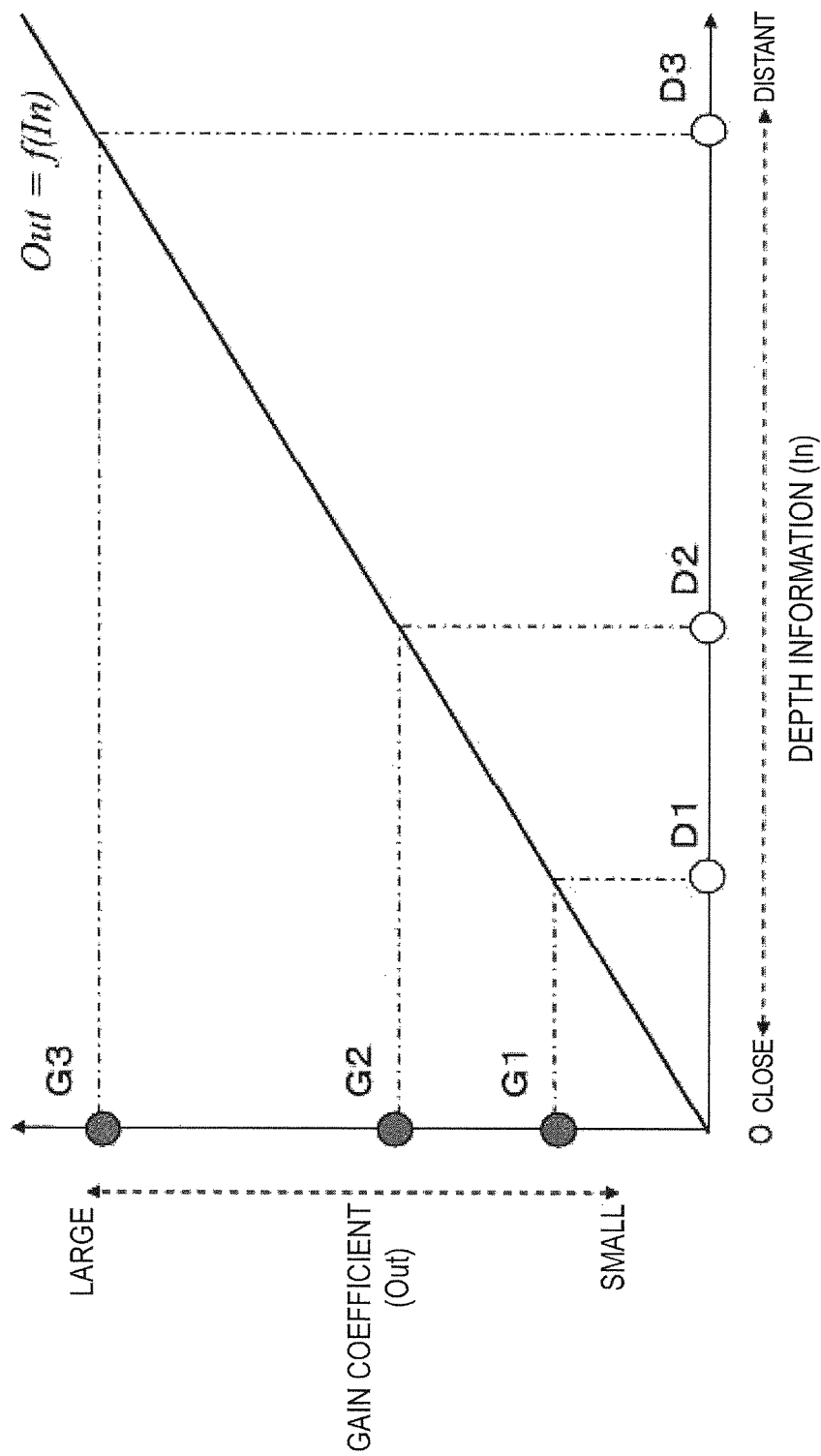
FIG. 15 is a diagram illustrating an example of a method of determining a gain coefficient executed in a gain coefficient calculating unit.

FIG. 15 illustrates an example of a method of determining the gain coefficient to be executed in the gain coefficient calculating unit 191. A horizontal axis shows depth information as an input signal. A vertical axis shows an output of a gain coefficient in the gain coefficient calculating unit 191.

The gain coefficient calculating unit 191 converts input depth information (In) by a preset function f(x) and outputs a gain coefficient (Out).

At this time, with respect to the function f(x), various setting can be used.

As an example of the function f(x), a linear function represented by an expression $f(x)=A \times x$ (A is a constant) is used. A is a preset constant and can be set to various values.

A conversion function in the gain coefficient calculating unit 191 is not limited to the linear function and non-linear conversion may be performed.

With respect to the depth information, a value according to each pixel of the differential signal is input and a gain coefficient according to each pixel is output.

FIG. 15 is a diagram illustrating a correspondence example of an input value (depth information) and an output value (gain coefficient) of the gain coefficient calculating unit. FIG. 15 illustrates an example of three output values (gain coefficients) that correspond to three input values (depth information).

It is assumed that the examples of the input values (depth information) are D1, D2, and D3 and depth values are correspond to three pixels. The depth is a value that corresponds to the distance from the observer (user) or the camera to the object.

The depths (=object distances) are deep from the front side to the inner side (distant from the user or the camera), in the order of D1<D2<D3. A position of depth information In =0 in FIG. 15 is a point viewed on a display screen when a generated image is displayed on a three-dimensional display apparatus.

At this time, examples of the output value (gain coefficient) are G1, G2, and G3 which are values obtained by inputting values of D1, D2, and D3 to the function f(x) of FIG. 15, respectively.

As described in this example, the gain coefficient calculating unit 191 outputs a gain coefficient according to each pixel of the differential signal.

FIGS. 16A to 16D illustrate an example of processing for controlling an amplitude value of the differential signal in the gain control unit 182.

FIGS. 16A to 16D illustrate examples of an input signal, a differential signal, depth information, and a corrected differential signal, respectively.

FIG. 16A illustrates an example of an input image signal.

FIG. 16B illustrates an image that is obtained by executing differentiating processing for the input image signal of FIG. 16A.

FIG. 16C illustrates depth information corresponding to the input image signal of FIG. 16A and illustrates the case in which depth values are given to three divided regions of an image.

In this case, the values of the depth information D3, D2, and D1 (D1<D2<D3) defined in FIG. 15 are given to image signals showing the depth information of FIG. 16C, sequentially from the upper side.

At this time, according to the relation of the depths and gain values described in FIG. 15, the gain values that are multiplied with each pixel of the differential signal of FIG. 16B become G3, G2, and G1 (G1<G2<G3), sequentially from the upper side of the image.

The corrected differential signal of FIG. 16D is an example of the processing result that is obtained by multiplying the gain value based on the depth information of FIG. 16C with each pixel of the differential signal of FIG. 16B.

In the corrected differential signal of FIG. 16D, a large gain value is multiplexed at the upper side of a screen (distant region) and a small gain value is multiplexed at the lower side of the screen (close region).

As a result, an amplitude value of the differential signal increases at the upper side of the screen (distant region) and the amplitude value of the differential signal decreases at the lower side of the screen (close region).

The parallax image generating unit 156 that executes the 2D3D conversion processing generates a new viewing point image using the differential signal having the different amplitude according to the distance and outputs the new viewing point image.

Next, processing that is executed by the non-linear conversion unit 183 will be described. The non-linear conversion unit 183 generates a parallax emphasis signal (E') that is obtained by converting the corrected differential signal (H') gain controlled according to the distance output from the gain control unit 182 in a non-linear manner and outputs the parallax emphasis signal (E') to the image synthesizing unit 84.

Figure 17:
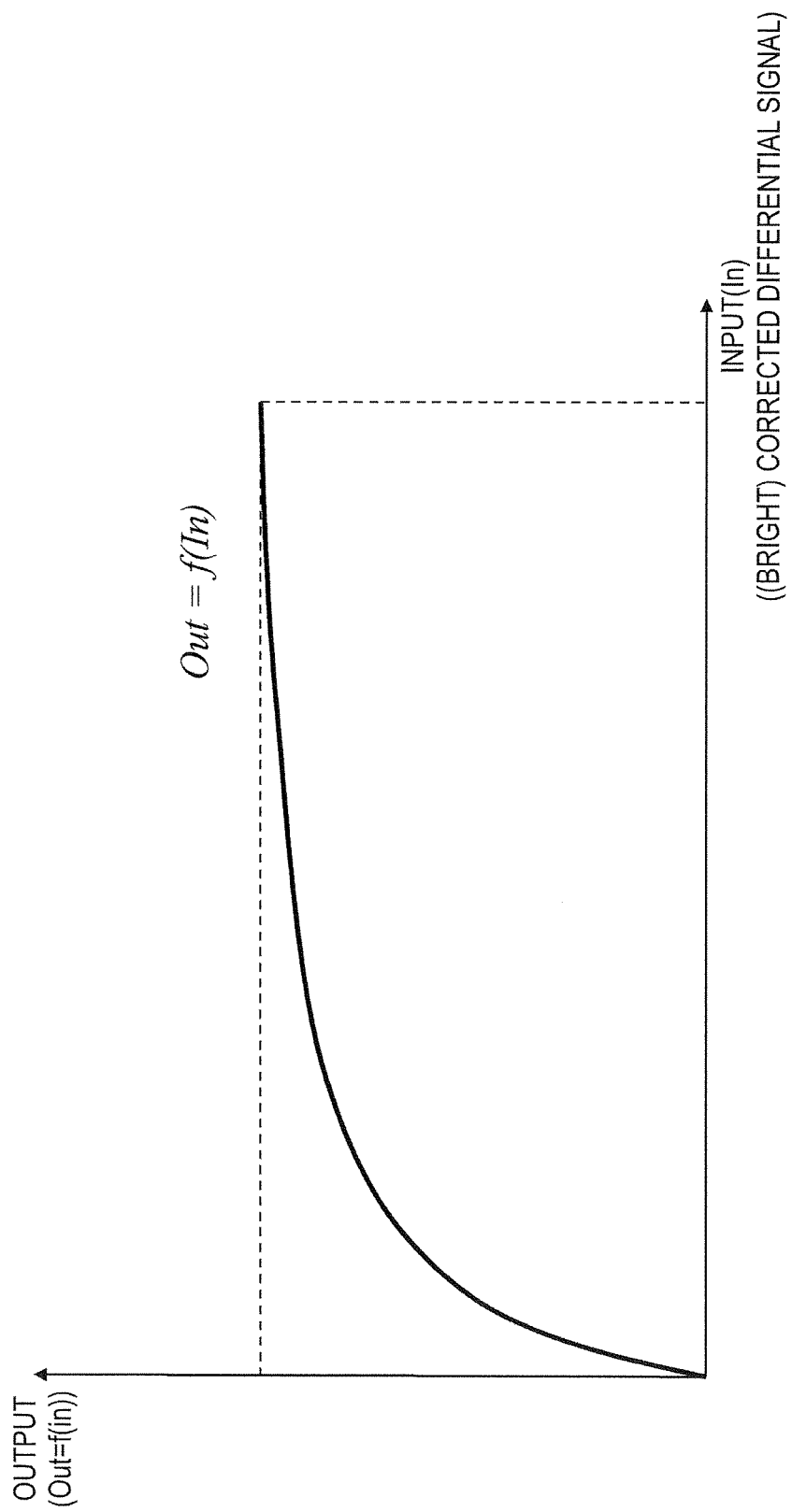
FIG. 17 is a diagram illustrating an example of non-linear conversion processing executed in a non-linear conversion unit.

FIG. 17 illustrates an example of the non-linear conversion processing that is executed in the non-linear conversion unit 183. A horizontal axis shows the differential signal that is gain controlled (corrected) according to the distance output from the gain control unit 182 which is a (brightness) corrected differential signal. A vertical axis shows an output after the non-linear conversion processing is executed in the non-linear conversion unit 183. The non-linear conversion unit 183 converts the input corrected differential signal (In) by the previously defined function f(x) and outputs the parallax emphasis signal (Out). That is, Out=f(In). At this time, in the function f(x), various setting can be used. As an example of the function f(x), an exponential function represented by an expression $f(x)=x^\gamma$ is used. $\gamma$ is a preset coefficient and can be set to various values.

The conversion coefficient in the non-linear conversion unit 183 is not limited to the exponential function and linear conversion may be performed.

The image synthesizing unit 184 executes processing for synthesizing the parallax emphasis signal output from the non-linear conversion unit 183 and the 2D image input to the parallax image generating unit 156 and generating a new viewing point image.

As illustrated by a dotted line in FIG. 13, the conversion processing of the non-linear conversion unit 183 may be omitted and the corrected differential signal (H') that is obtained by performing the gain control according to the distance for the differential signal generated by the differentiator 181 by the gain control unit 182 may be input indirectly to the image synthesizing unit 184. In this case, the image synthesizing unit 184 executes processing for applying the corrected differential signal (H') gain controlled according to the depth (object distance) and generating the new viewing point image.

Next, processing of the image synthesizing unit 184 will be described.

The image synthesizing unit 184 executes processing for applying a spatial feature amount generated from a processing object image, that is, a differential signal of a brightness signal or a parallax emphasis signal generated by converting the differential signal in a non-linear manner and generating the new viewing point image.

FIGS. 18A to 19E illustrate a concept of image synthesis processing executed in the image synthesizing unit 184.

FIGS. 18A to 18E and FIGS. 19A to 19E illustrate an input signal (S), a differential signal (H), a corrected (gain controlled) differential signal (H'), a right eye image signal, and a left eye image signal, sequentially from the upper side, with respect to an image region having the large distance (image region having the large depth) and an image region having the small distance (image region having the small depth), respectively.

If the description is made in association with the depth information of FIG. 16C, FIGS. 18A to 18E are diagrams illustrating a processing example with respect to the image region of FIG. 16C in which the distance of the upper portion of the image is large (=D3) (image region in which the depth is large). Meanwhile, FIGS. 19A to 19E are diagrams illustrating a processing example with respect to the image region of FIG. 16C in which the distance of the lower portion of the image is small (=D1) (image region in which the depth is small).

First, the processing example in the image region having the large distance (image region having the large depth) illustrated in FIGS. 18A to 18E will be described.

In the input signal (S) of FIG. 18A, a brightness change of any horizontal line of any frame of video data is illustrated. One line in which there is a high brightness region having high brightness at a center portion is illustrated. In a region A from the line position (x1) to the line position (x2) the brightness gradually increases, in a region from the line position (x2) to the line position (x3) there is a high brightness portion in which a high brightness level is maintained, and in a region B from the line position (x3) to the line position (x4) the brightness gradually decreases.

The differential signal (H) of FIG. 18B is the differentiating result of the input signal of FIG. 18A. The differential signal is the signal that is generated in the differentiator 181 of the parallax image generating unit 156 illustrated in FIG. 13.

As illustrated in FIGS. 18A to 18E, the differential signal (H) that is generated by the differentiator 181 takes a positive value in the region A in which the brightness of the input signal (S) of FIG. 18A increases and takes a negative value in the region B in which the brightness of the input signal of FIG. 18A decreases.

The corrected (gain controlled) differential signal (H') of FIG. 18C is the signal that is generated in the gain control unit 182 of the parallax image generating unit 156 illustrated in FIG. 13 and is the signal that is obtained by correcting (gain controlling) the differential signal of FIG. 18B on the basis of the depth information. The example illustrated in FIGS. 18A to 18E is the processing example in the image region (image region having the large depth) in which the distance is large (for example, D3 of FIGS. 15 and 16C). As described with reference to FIGS. 15 to 16D, the correction processing by the large gain (G3) is executed and the amplitude of the differential signal is corrected with the larger amplitude.

A dotted line of FIG. 18C illustrates a non-corrected signal (=differential signal (H) of FIG. 18B) and a solid line of FIG. 18C illustrates a differential signal (H') corrected according to the distance. As such, the amplitude of the corrected differential signal (H') is corrected with the large amplitude, by the gain control according to the distance.

The right eye image signal of FIG. 18D and the left eye image signal of FIG. 18E are the signals that are generated by the image synthesizing unit 184 illustrated in FIG. 13.

When the 2D image input from the demosaicking processing unit 153 to the parallax image generating unit 156 illustrated in FIG. 9 is the input image illustrated in FIG. 18A, the right eye image signal of FIG. 18D is generated by shifting the input image to the right side. By shifting the input image to the left side, the left eye image signal of FIG. 18E is generated.

Specifically, the right eye image signal of FIG. 18D or the left eye image signal of FIG. 18E is generated by synthesizing the input signal (S) of FIG. 18A and the parallax emphasis signal (E') to be the result (output of the non-linear conversion unit 183) obtained by performing non-linear conversion with respect to the corrected (gain controlled) differential signal (H') of FIG. 18C in the non-linear conversion unit 183.

As illustrated in FIG. 18D, when the corrected differential signal (H') corrected by the large gain (G3) is synthesized, an image signal having the large right shift amount is generated, as compared with when the non-corrected differential signal (H) is synthesized. Likewise, in FIG. 18D, an image signal having the large left shift amount is generated.

Next, the processing example in the image region having the small distance (image region having the small depth) illustrated in FIGS. 19A to 19E will be described.

FIGS. 19A to 19E illustrate the processing example with respect to the image region of FIG. 16C in which the distance of the lower portion of the image is small (=D1) (image region having the small depth).

An input signal of FIG. 19A and a differential signal of FIG. 19B are the same signals as the input signal of FIG. 18A and the differential signal of FIG. 18B. The differential signal (H) of FIG. 19B is the differentiating result of the input signal (S) of FIG. 19A. The differential signal is the signal that is generated in the differentiator 181 illustrated in FIG. 13. As illustrated in FIGS. 19A to 19E, the differential signal that is generated by the differentiator 181 takes a positive value in a region A in which the brightness of the input signal (S) of FIG. 19A increases and takes a negative value in a region B in which the brightness of the input signal (S) of FIG. 19A decreases.

The corrected (gain controlled) differential signal (H') that is illustrated in FIG. 19C is the signal that is generated in the gain control unit 182 illustrated in FIG. 13 and is the signal that is obtained by correcting (gain controlling) the differential signal of FIG. 19B on the basis of the depth information.

The example illustrated in FIGS. 19A to 19E is the processing example in the image region (image region having the small depth) in which the distance is small (for example, D1 of FIGS. 15 and 16C). As described with reference to FIGS. 15 to 16D, the amplitude of the differential signal is corrected with the small amplitude by the small gain (G1).

A dotted line of FIG. 19C illustrates a non-corrected signal (=differential signal (H) of FIG. 19B) and a solid line of FIG. 19C illustrates a differential signal corrected according to the distance. As such, the amplitude of the corrected differential signal is corrected with the small amplitude, by the gain control according to the distance.

The right eye image signal of FIG. 19D and the left eye image signal of FIG. 19E are the signals that are generated by the image synthesizing unit 184 illustrated in FIG. 13. The image synthesizing unit 184 synthesizes the input signal (S) of FIG. 19A and the parallax emphasis signal (E') to be the result (output of the non-linear conversion unit 183) obtained by performing non-linear conversion on the corrected (gain controlled) differential signal (H') of FIG. 19C in the non-linear conversion unit 183 and generates the right eye image signal of FIG. 19D or the left eye image signal of FIG. 19E.

For example, when the 2D image input from the demosaicking processing unit 153 to the parallax image generating unit 156 illustrated in FIG. 9 is the input image illustrated in FIG. 19A, the right eye image signal of FIG. 19D is generated by shifting the input image to the right side.

By shifting the input image to the left side, the left eye image signal of FIG. 19E is generated.

As illustrated in FIG. 19D, when the corrected differential signal (H') corrected by the small gain (G1) is synthesized, an image signal having the small right shift amount is generated, as compared with when the non-corrected differential signal (H) is synthesized. Likewise, in FIG. 19D, an image signal having the small left shift amount is generated.

As such, when the parallax image generating unit 156 generates an image recognized in a direction further inward than a display screen, the parallax image generating unit 156 generates a corrected differential signal having the large amplitude in the case of distance=large and generates a corrected differential signal having the small amplitude in the case of distance=small (refer to FIGS. 18C and 19C), synthesizes the corrected differential signals (or parallax emphasis signals, which are the non-linear conversion results thereof) and the input signal of FIGS. 18A and 19A, and generates the right eye image signals of FIGS. 18D and 19D or the left eye image signals of FIGS. 18E and 19E corresponding to images observed from viewing points different from the viewing points of the input images.

Processing for generating the right eye image signals of FIGS. 18D and 19D and the left eye image signals of FIGS. 18E and 19E will be described using expressions.

Brightness levels of video data that correspond to the input signals of FIGS. 18A and 19A are set to (S) and signal levels of the differential signals of FIGS. 18B and 19B are set to (H).

A signal level of the corrected differential signal that corresponds to the correction result of the differential signal in the gain control unit 182 is set to (H').

When the corrected differential signal (H') is generated, the gain value (G) that is multiplied with the differential signals (H) of FIGS. 18B and 19B is determined from the preset function, on the basis of the depth information (D).

A gain value in the case of the large distance illustrated in FIGS. 18A to 18E is set to G3 and a gain value in the case of the small distance illustrated in FIGS. 19A to 19E is set to G1.

In the examples illustrated in FIGS. 18A to 19E, a relation of G3>1>G1 is assumed.

If the signal levels of the corrected differential signals of FIGS. 18C and 19C are represented by (H'), signals corrected using the gain values G3 and G1, (H') can be represented by the following expressions.

A level of a signal that is calculated by an expression H'=G3×H in the corrected differential signal (H') in the case of the large distance illustrated in FIGS. 18A to 18E and a level of a signal that is calculated by an expression H'=G1×H in the corrected differential signal (H') in the case of the small distance illustrated in FIGS. 19A to 19E become signal levels (H') of the corrected differential signals of FIGS. 18C and 19C.

In the case of the large distance illustrated in FIG. 18C, if the corrected differential signal (H') illustrated by the solid line and the non-corrected differential signal (=FIG. 18B) illustrated by the dotted line are compared, the amplitude of the corrected differential signal (H') illustrated by the solid line becomes larger than the amplitude of the non-corrected differential signal illustrated by the dotted line.

Meanwhile, in the case of the small distance illustrated in FIG. 19C, if the corrected differential signal (H') illustrated by the solid line and the non-corrected differential signal (=FIG. 19B) illustrated by the dotted line are compared, the amplitude of the corrected differential signal (H') illustrated by the solid line becomes smaller than the amplitude of the non-corrected differential signal illustrated by the dotted line.

This is because the corrected differential signals illustrated in FIGS. 18C and 19C are generated by multiplying the different gain values.

That is, with respect to the pixel in which a value of the depth information in the depth map output by the parallax detecting unit 155 is large (the distance from the camera is large), the differential signal of FIG. 18B is multiplied by the large gain value, the differential signal is corrected, and the corrected differential signal illustrated in FIG. 18C is generated.

Meanwhile, with respect to the pixel in which a value of the depth information in the depth map output by the parallax detecting unit 155 is small (the distance from the camera is small), the differential signal of FIG. 19B is multiplied by the small gain value, the differential signal is corrected, and the corrected differential signal illustrated in FIG. 19C is generated.

With respect to the corrected differential signals illustrated in FIGS. 18C and 19C, the non-linear conversion processing is executed in the non-linear conversion unit 183 according to the setting described above with reference to FIG. 11 and the parallax emphasis signal (E') is generated.

The image synthesizing unit 184 inputs the video data (S) corresponding to the input signals of FIGS. 18A and 19A and the parallax emphasis signals (E') obtained by executing the non-linear conversion for the corrected differential signals (H') of FIGS. 18C and 19C and generates a right eye image signal (Right) and a left eye image signal (Left) according to the following equations.

$$\text{Right} = S - E'$$

$$\text{Left} = S + E'$$

The obtained signals are the right eye image signals illustrated by the solid lines in FIGS. 18D and 19D and the left eye image signals illustrated in FIGS. 18E and 19E.

Meanwhile, the signals illustrated by the dotted lines in FIGS. 18D and 18E and FIGS. 19D and 19E correspond to the right eye image signal and the left eye image signal that are generated by applying the non-corrected differential signals, instead of the corrected differential signals of FIGS. 18C and 19C, that is, the differential signals (H) of FIGS. 18B and 19B and using the parallax emphasis signals (E) obtained by executing the non-linear conversion for the differential signals. That is, Right=S−E and Left=S+E.

If the solid lines and the dotted lines displayed in the right eye image signals of FIGS. 18D and 19D and the left eye image signals of FIGS. 18E and 19E are compared, in the case of the large distance illustrated in FIGS. 18A to 18E, in both the right eye image signal of FIG. 18D and the left eye image signal of FIG. 18E, an edge portion (change portion of the signal) of the solid line (corrected differential signal) is steeper than an edge portion of the dotted line (non-corrected differential signal) and the shift amount of the signal becomes larger than the shift amount of the input signal of FIG. 18A.

Meanwhile, in the case of the small distance illustrated in FIGS. 19A to 19E, in both the right eye image signal of FIG. 19D and the left eye image signal of FIG. 19E, an edge portion of the solid line (corrected differential signal) is smoother than an edge portion of the dotted line (non-corrected differential signal) and the shift amount of the signal becomes smaller than the shift amount of the input signal of FIG. 19A.

As such, the parallax image generating unit 156 executes 2D3D conversion processing for executing parallax setting according to the object distance using the depth map 167 input from the parallax detecting unit 155, for the 2D-RGB image 163 input from the demosaicking processing unit 153, generates the left eye image (L image) 171 and the right eye image (R image) 172 applied to the 3D image display, and outputs the left eye image and the right eye image through the image output unit 157.

As described above, the image processing unit 17 illustrated in FIG. 9 acquires the images from the different viewing points acquired according to the polarizer arranged on the imaging element 16, that is, the left eye image and the right eye image, and generates the depth map corresponding to the parallax information on the basis of the images.

The image processing unit 17 acquires a normal 2D image by the pixels in which the polarizer is not arranged and outputs high-definition left and right eye images applied to the 3D image display by image processing from information thereof.

In the embodiment described above, the first polarizing unit 12 that is described with reference to FIGS. 1A to 1C has the configuration in which the horizontal polarization region is set to the right side and the vertical polarization region is set to the left side. However, the setting may be reversed.

In addition to the combination of the horizontal polarization and the vertical polarization, any combination of polarization regions having two different polarization directions such as polarization regions transmitting polarized light of an oblique direction may be applied.

The second polarizing unit 15 should set polarization regions having the same combination as the polarization regions set to the first polarizing unit 12, to correspond to setting of the polarization regions of the first polarizing unit 12.

[4. Example of Acquisition Configuration of Plurality of Viewing Point Images using Microlens]

In the configuration described above, the polarization region of the second polarizing unit 15 illustrated in FIGS. 1A to 1C is configured using the wire grid polarizer. The wire grid polarizer is a polarizing element that has a configuration in which minute wires (for example, aluminum (Al) wires) are arranged at small intervals and achieves a polarization characteristic according to a wire arrangement direction.

The left eye image corresponding to the image observed from the left viewing point and the right eye image corresponding to the image observed from the right viewing point are acquired using the polarization characteristic according to the wire arrangement direction and the image observed from the central viewing point is acquired in the non-polarization region in which the wire grid is not arranged.

In addition to the configuration in which the wire grid is used, a configuration in which images observed from different viewing points are acquired may be used.

For example, the images can be acquired from the different viewing points, by the configuration in which the microlens is arranged on the front surface of the imaging element.

The image processing of the present disclosure described above can be executed as the processing for the image photographed using the microlens.

The configuration in which the images observed from the different viewing points are photographed using the microlens will be described with respect to FIG. 20.

FIG. 20 is a diagram illustrating an entire configuration of an imaging apparatus 300 according to this embodiment.

In the imaging apparatus 300 illustrated in FIG. 20, the same structural elements as the structural elements of the imaging apparatus 10 described with reference to FIG. 1A are denoted with the same reference numerals.

Incident light corresponding to a photographed object is input through a photographing lens 11. The light that is incident through the photographing lens 11 is input to an imaging element 16 through a diaphragm 13, an image forming lens 14, and a microlens array 301.

FIG. 20 is a diagram of the imaging apparatus (camera) 300 viewed from the upper side, that is, a top view. A schematic diagram of the imaging apparatus 300 and a photographer 20 along with XYZ coordinate axes is illustrated at the lower left of FIG. 20.

As illustrated by a vertical dotted line (X axis) near the center of FIG. 20, the upper side of FIG. 20 becomes a right (R) side from the photographer and the lower side of FIG. 20 becomes a left (L) side from the photographer.

The imaging element 16 is a photoelectric conversion element such as a CCD and a CMOS and generates an electrical signal according to object light and outputs the electrical signal to an image processing unit 17.

The image processing unit 17 executes signal processing according to a predetermined algorithm and stores image data as the processing result in a storage unit 18.

The configuration and the processing of the image processing unit 17 are the same as the configuration and processing described above with reference to FIGS. 7 to 19.

The imaging apparatus 300 illustrated in FIG. 20 is different from the imaging apparatus 10 described with reference to FIGS. 1A to 1C in that the first polarizing unit 12 and the second polarizing unit 15, which are the structural elements of the imaging apparatus 10 described with reference to FIGS. 1A to 1C, are not used and the microlens array 301 is arranged.

The imaging apparatus 300 illustrated in FIG. 20 images an image from a different viewing point using the microlens array 301.

FIGS. 21A to 21C are diagrams illustrating a specific configuration example of the imaging element 16 and the microlens array 301 and a photographing configuration of an image from a different viewing point.

FIG. 21A illustrates a configuration example of the microlens array 301 that is set to an imaging element having a Bayer arrangement. In FIG. 21A, a transverse direction is a horizontal direction, that is, an x direction, and a longitudinal direction is a vertical direction, that is, a y direction.

The microlens 311 is arranged on a left/right viewing point image acquisition region 312. One microlens 311 is arranged on 2×2 pixels corresponding to one unit of the Bayer arrangement.

The region in which the microlens 311 is arranged is a region in which the left eye image, which is the image from the left eye viewing point, and the right eye image, which is the image from the right eye viewing point, are acquired, similar to the polarization region in the embodiment described above, that is, the wire grid arrangement region.

The region in which the microlens is not arranged corresponds to the non-polarization region in the embodiment described above and becomes a central viewing point image acquisition region 313 in which a normal image from a central viewing point is acquired.

One microlens 311 is arranged to correspond to one unit of the Bayer arrangement, that is, the 2×2 pixels. An enlarged view of the 2×2 pixels is a plan view of a microlens arrangement unit illustrated in FIG. 21B.

One microlens is arranged with respect to four RGGB pixels.

Among the four RGGB pixels illustrated in FIG. 21B, the right G and B pixels become left eye image acquisition pixels 321 that correspond to the image from the left eye viewing point. The left R and G pixels become right eye image acquisition pixels 322 that correspond to the image from the right eye viewing point.

In a cross-sectional view of the microlens arrangement unit that is illustrated in FIG. 21C, a path of light incident through the microlens is illustrated. FIG. 21C corresponds to a cross-sectional configuration of a line AB illustrated in FIG. 21B.

As illustrated in FIG. 21C, the left eye viewing point image is input to a photodiode 333 corresponding to a B pixel forming the imaging element 16 through the microlens 331 and a B region of a color filter 332.

Meanwhile, the right eye viewing point image is input to the photodiode 333 corresponding to a G pixel forming the imaging element 16 through the microlens 331 and a G region of the color filter 332.

As such, the left eye image that corresponds to the image from the left viewing point is photographed in the right two pixels among the 2×2 pixels in which the microlens is arranged and the right eye image that corresponds to the image from the right viewing point is photographed in the left two pixels among the 2×2 pixels in which the microlens is arranged.

That is, in the left/right viewing point image acquisition region 312 illustrated in FIG. 21A, the left eye image and the right eye are photographed in units of four pixels in which the microlens 311 is arranged.

For example, the pixel separating unit 151 of the image processing unit 17 described with reference to FIG. 9 outputs pixel value information of the left/right viewing point image acquisition region 312 illustrated in FIG. 21A to the left/right viewing point image interpolation processing unit 154 and outputs pixel value information of the central viewing point image acquisition region 313 to the central viewing point image interpolation processing unit 152.

Then, the same processing as the processing described above is executed.

That is, the depth map based on the pixel value information of the left/right viewing point image acquisition region 312 is generated and the left eye image and the right eye image that are applicable to the three-dimensional image display are generated by the 2D-3D conversion processing in which the depth map is applied to the 2D-Raw image generated by the interpolation processing based on the pixel value information of the central viewing point image acquisition region 313.

In the left/right viewing point image interpolation processing unit 154, an image from each viewing point may be generated using only the G pixels of the left/right viewing point image acquisition region 312, according to the processing described above with reference to FIG. 11.

As illustrated in FIG. 21B, there are two G pixels to acquire images photographed from different viewing points in the microlens arrangement unit. The G pixels correspond to the right pixel and the left pixel and left and right images of one line can be generated from the G pixels arranged in a horizontal direction.

As illustrated in FIG. 21C, the microlens 331 is optically designed such that only light of a direction biased to the center of an optical axis passes when the light is transmitted to the photodiode 333, which is a light receiving unit, through the color filter 332 arranged on the lower portion. Detection of a phase of an object image by the microlens is described in Japanese Patent Application Laid-open Publication No. 2010-204294.

The pixel arrangement illustrated in FIGS. 21A to 21C can be realized by arranging the microlens array on the Bayer arrangement. In the configuration in which the image from each viewing point is generated using only G pixels, according to the processing described above with reference to FIG. 11, the B pixel or the R pixel other than the G pixel in the left/right viewing point image acquisition region 31 is not used.

When there are an unnecessary R pixel and B pixel when the parallax is detected, the resolution of a vertical direction of the depth map is deteriorated. In order to resolve this problem, only the G pixels may be arranged in the left/right viewing point image acquisition region 312, as illustrated in FIGS. 22A to 22C.

As illustrated in FIG. 22A, the entire left/right viewing point image acquisition region 312 in which the microlens 311 is arranged is configured using only the G pixels. A color filter of the left/right viewing point image acquisition region is configured using a color filter that transmits only a green wavelength.

By this configuration, in the left/right viewing point image acquisition region 312 of the two lines in which the microlens is arranged, G pixel values of the left eye image and the right eye image are alternately photographed in all pixels. As a result, high-precision left and right eye images can be generated and high-precision parallax information can be generated.

Instead of the G pixels, white pixels (W pixels) that transmit all wavelengths of visible light from red to blue may be arranged and generation of a parallax image based on the W pixels and generation of a depth map may be performed.

[5. Example of Acquisition Configuration of Plurality of Viewing Point Images using Microlens and Light Shielding Film]

Next, an example of an acquisition configuration of a plurality of viewing point images using a microlens and a light shielding film will be described.

FIG. 23 is a diagram illustrating an entire configuration of an imaging apparatus 500 according to this embodiment.

In the imaging apparatus 500 illustrated in FIG. 23, the same structural elements as the structural elements of the imaging apparatus 10 described with reference to FIG. 1A are denoted with the same reference numerals.

Incident light corresponding to a photographed object is input through a photographing lens 11.

The light that is incident through the photographing lens 11 is input to an imaging element 16 through a diaphragm 13, an image forming lens 14, a microlens array 501, and a light shielding film 502.

FIG. 23 is a diagram of the imaging apparatus (camera) 500 viewed from the upper side, that is, a top view. A schematic diagram of the imaging apparatus 500 and a photographer 20 along with XYZ coordinate axes is illustrated at the lower left of FIG. 23.

As illustrated by a vertical dotted line (X axis) near the center of FIG. 23, the upper side of FIG. 23 becomes a right (R) side from the photographer and the lower side of FIG. 23 becomes a left (L) side from the photographer.

The imaging element 16 is a photoelectric conversion element such as a CCD and a CMOS and generates an electrical signal according to object light and outputs the electrical signal to an image processing unit 17.

The image processing unit 17 executes signal processing according to a predetermined algorithm and stores image data as the processing result in a storage unit 18.

The configuration and the processing of the image processing unit 17 are the same as the configuration and processing described with reference to FIGS. 7 to 19.

The imaging apparatus 500 illustrated in FIG. 23 is different from the imaging apparatus 10 described with reference to FIGS. 1A to 1C in that the first polarizing unit 12 and the second polarizing unit 15, which are the structural elements of the imaging apparatus 10 described with reference to FIGS. 1A to 1C, are not used and the microlens array 501 and the light shielding film 502 are arranged.

The imaging apparatus 500 illustrated in FIG. 23 images an image from a different viewing point using the microlens array 501 and the light shielding film 502.

FIGS. 24A to 24C are diagrams illustrating a specific configuration example of the imaging element 16 and the microlens array 501 and the light shielding film 502 and a photographing configuration of an image from a different viewing point.

FIG. 24A illustrates a configuration example of the microlens array 501 and the light shielding film 502 that are set to an imaging element having a Bayer arrangement. In FIG. 24A, a transverse direction is a horizontal direction, that is, an x direction, and a longitudinal direction is a vertical direction, that is, a y direction.

The microlens 511 is arranged on a left/right viewing point image acquisition region 521. One microlens 511 is arranged on each pixel of the Bayer arrangement.

The light shielding film 512 is arranged on the left/right viewing point image acquisition region 521. The light shielding film 512 is configured to shield light in a part of a region of each pixel and transmit light in a part of the region.

The region in which the microlens 511 and the light shielding film 512 are arranged is the polarization region described in the embodiment, that is, a region in which the left eye image, which is the image from the left eye viewing point, and the right eye image, which is the image from the right eye viewing point, are acquired, similar to the wire grid arrangement region.

The region in which the microlens 511 and the light shielding film 512 are not arranged corresponds to the non-polarization region in the embodiment described above and becomes a central viewing point image acquisition region 522 in which a normal image from a central viewing point is acquired.

FIG. 24B is an enlarged view of the 2×2 pixels of a left/right viewing point image acquisition region 521.

Each microlens 511 is arranged to correspond to each pixel. Four microlenses are arranged with respect to four RGGB pixels.

Among the four RGGB pixels illustrated in FIG. 24B, the right G and B pixels become left eye image acquisition pixels 531 that correspond to the image from the left eye viewing point. The left R and G pixels become right eye image acquisition pixels 532 that correspond to the image from the right eye viewing point.

In a cross-sectional view that is illustrated in FIG. 24C, a path of light incident through the microlens and the light shielding film is illustrated. FIG. 24C corresponds to a cross-sectional configuration of a line AB illustrated in FIG. 24B.

As illustrated in FIG. 24C, in the left eye viewing point image, only light that passes through the microlens 541 and the B region of the color filter 542 and passes through the transmission region other than the light shielding region by the light shielding film 543 is incident on the photodiode 333 corresponding to the B pixel forming the imaging element 16.

Meanwhile, in the right eye viewing point image, only light that passes through the microlens 541 and the G region of the color filter 542 and passes through the transmission region other than the light shielding region by the light shielding film 543 is incident on the photodiode 333 corresponding to the G pixel forming the imaging element 16.

As such, the left eye image that corresponds to the image from the left viewing point is photographed in the right two pixels among the 2×2 pixels of the left/right viewing point image acquisition region 521 in which the microlens and the light shielding film are arranged and the right eye image that corresponds to the image from the right viewing point is photographed in the left two pixels among the 2×2 pixels in which the microlens and the light shielding film are arranged.

That is, in the left/right viewing point image acquisition region 521 illustrated in FIG. 24A, the left eye image and the right eye are photographed in units of four pixels in which the microlens 511 and the light shielding film 512 are arranged.

For example, the pixel separating unit 151 of the image processing unit 17 described with reference to FIG. 9 outputs pixel value information of the left/right viewing point image acquisition region 521 illustrated in FIG. 24A to the left/right viewing point image interpolation processing unit 154 and outputs pixel value information of the central viewing point image acquisition region 522 to the central viewing point image interpolation processing unit 152.

Then, the same processing as the processing described above is executed.

That is, the depth map based on the pixel value information of the left/right viewing point image acquisition region 521 is generated and the left eye image and the right eye image that are applicable to the three-dimensional image display are generated by the 2D-3D conversion processing in which the depth map is applied to the 2D-Raw image generated by the interpolation processing based on the pixel value information of the central viewing point image acquisition region 522.

In the left/right viewing point image interpolation processing unit 154, an image from each viewing point may be generated using only the G pixels of the left/right viewing point image acquisition region 521, according to the processing described above with reference to FIG. 11.

As illustrated in FIG. 24B, there are two G pixels to acquire images photographed from different viewing points in the 2×2 pixels of the left/right viewing point acquisition region 521. The G pixels correspond to the right pixel and the left pixel and left and right images of one line can be generated from the G pixels arranged in a horizontal direction.

Detection of a phase of an object image by the light shielding film is described in Japanese Patent Application Laid-Open Publication No. 2009-192605.

The pixel arrangement illustrated in FIGS. 24A to 24C can be realized by arranging the microlens array and the light shielding film on the Bayer arrangement. In the configuration in which the image from each viewing point is generated using only G pixels, according to the processing described above with reference to FIG. 11, the B pixel or the R pixel other than the G pixel in the left/right viewing point image acquisition region 521 is not used.

When there are an unnecessary R pixel and B pixel when the parallax is detected, the resolution of a vertical direction of the depth map is deteriorated. In order to resolve this problem, only the G pixels may be arranged in the left/right viewing point image acquisition region 521, as illustrated in FIGS. 25A to 25C.

Figures 25A, 25B, 25C:
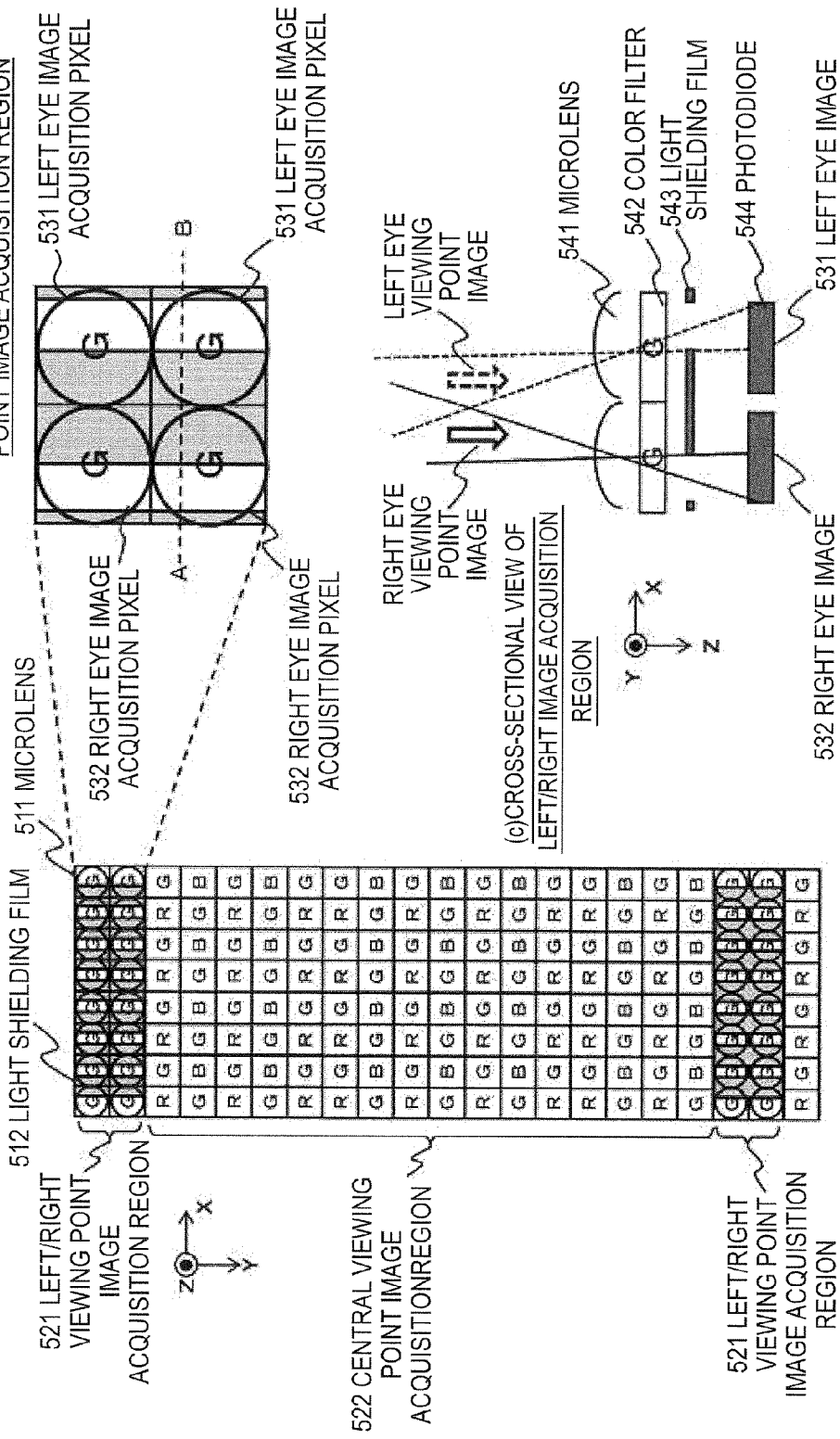
FIG. 25A is a diagram illustrating a first view of a configuration of an imaging element, an arrangement configuration of a microlens array, and processing for acquiring left/right viewing point images.
FIG. 25B is a diagram illustrating a second view of a configuration of an imaging element, an arrangement configuration of a microlens array, and processing for acquiring left/right viewing point images.
FIG. 25C is a diagram illustrating a third view of a configuration of an imaging element, an arrangement configuration of a microlens array, and processing for acquiring left/right viewing point images.

As illustrated in FIG. 25A, the entire left/right viewing point image acquisition region 521 in which the microlens 511 and the light shielding film 512 are arranged is configured using the G pixels. A color filter of the left/right viewing point image acquisition region is configured using a color filter that transmits only a green wavelength.

By this configuration, in the left/right viewing point image acquisition region 521 of the two lines in which the microlens is arranged, G pixel values of the left eye image and the right eye image are alternately photographed in all pixels. As a result, high-precision left and right eye images can be generated and high-precision parallax information can be generated.

Instead of the G pixels, white pixels (W pixels) that transmit all wavelengths of visible light from red to blue may be arranged and generation of a parallax image based on the W pixels and generation of a depth map may be performed.

[6. Summary of Configuration of Present Disclosure]

The configuration of the present disclosure has been described with reference to the specific embodiments. However, it will be apparent to those skilled in the art that various modifications and substitutions can be made without departing from the scope of the present disclosure. Therefore, it should be understood that the above embodiments are not limitative in all aspects. The scope of the present disclosure is defined by the appended claims.

Additionally, the present technology may also be configured as below.

(1) An image processing apparatus including:
an imaging element;
an incident light control unit that performs incident light control to cause the imaging element to photograph a plurality of viewing point images corresponding to images observed from different viewing points; and
an image processing unit that executes signal processing for an output signal of the imaging element,
wherein the incident light control unit has an incident light control configuration to acquire three viewing point images of a left eye viewing point image, a right eye viewing point image, and a central viewing point image, and
the image processing unit includes:
a parallax detecting unit that applies two different viewing point images of the left eye viewing point image and the right eye viewing point image and generates parallax information in which an object distance is reflected;
an image correcting unit that executes correction processing for the central viewing point image from the imaging element and generates a two-dimensional image; and
a parallax image generating unit that applies the parallax information generated by the parallax detecting unit, executes image conversion processing of the two-dimensional image generated by the image correcting unit, and generates a left eye image and a right eye image for three-dimensional image display.

(2) The image processing apparatus according to (1),
wherein the incident light control unit includes:
a first polarizing unit that has a first polarization region and a second polarization region to transmit different polarized light; and
a second polarizing unit that causes transmission light of the first polarizing unit to be incident and includes a third polarization region to transmit only the transmission light of the first polarization region, a fourth polarization region to transmit only the transmission light of the second polarization region, and a total transmission region to transmit the transmission light of the first polarization region and the second polarization region, and the image processing unit includes:
a parallax detecting unit that applies two different viewing point images of an image based on the transmission light of the third polarization region of the second polarizing unit and an image based on the transmission light of the fourth polarization region of the second polarizing unit and generates parallax information in which an object distance is reflected;
an image correcting unit that executes correction processing for an input image from the imaging element and generates a two-dimensional image; and
a parallax image generating unit that applies the parallax information generated by the parallax detecting unit, executes image conversion processing of the two-dimensional image generated by the image correcting unit, and generates a left eye image and a right eye image for three-dimensional image display.

(3) The image processing apparatus according to (1) or (2),
wherein the third polarization region and the fourth polarization region of the second polarizing unit are polarization regions that are configured using a wire grid polarizer.

(4) The image processing apparatus according to claim (1),
wherein the incident light control unit has a microlens array in which microlenses are arranged on a part of a region of the imaging element, and
the image processing unit includes:
a parallax detecting unit that applies two different viewing point images obtained from output signals from pixels forming the imaging element corresponding to a microlens arrangement region and generates parallax information in which an object distance is reflected;
an image correcting unit that executes correction processing for an image obtained from output signals from pixels forming the imaging element corresponding to a microlens non-setting region and generates a two-dimensional image; and
a parallax image generating unit that applies the parallax information generated by the parallax detecting unit, executes image conversion processing of the two-dimensional image generated by the image correcting unit, and generates a left eye image and a right eye image for three-dimensional image display.

(5) The image processing apparatus according to (1),
wherein the incident light control unit includes:
a microlens array in which microlenses are arranged on a part of a region of the imaging element; and
a light shielding film that is set to an arrangement region of the microlenses and shields a part of incident light with respect to the imaging element, and
the image processing unit includes:
a parallax detecting unit that applies two different viewing point images obtained from output signals from pixels forming the imaging element corresponding to the arrangement region of the microlenses and the light shielding film and generates parallax information in which an object distance is reflected;
an image correcting unit that executes correction processing with respect to an image obtained from output signals of pixels forming the imaging element corresponding to a non-setting region of the microlenses and the light shielding film and generates a two-dimensional image; and
a parallax image generating unit that applies the parallax information generated by the parallax detecting unit, executes image conversion processing of the two-dimensional image generated by the image correcting unit, and generates a left eye image and a right eye image for three-dimensional image display.

(6) The image processing apparatus according to any one of (1) to (5),
wherein the imaging element includes:
a left/right viewing point image acquisition region to acquire two different viewing point images to generate parallax information in which an object distance is reflected; and
a central viewing point image acquisition region to generate an image photographed from one viewing point.

(7) The image processing apparatus according to any one of (1) to (6),
wherein the left/right viewing point image acquisition region is configured using pixels of one color, and
the image processing unit has a parallax detecting unit that applies two different viewing point images obtained from output signals of the left/right viewing point image acquisition region configured using the pixels of one color, and generates parallax information in which an object distance is reflected.

(8) The image processing apparatus according to any one of (1) to (7),
wherein the image processing unit applies two different viewing point images obtained from output signals from pixels forming the imaging element and generates a depth map in which object distance information of images is reflected as parallax information in which an object distance is reflected, and generates a left eye image and a right eye image for three-dimensional image display by image conversion processing to which the depth map is applied.

(9) The image processing apparatus according to any one of (1) to (8),
wherein the image processing unit includes:
a parallax detecting unit that applies two different viewing point images obtained from the imaging element and generates parallax information in which an object distance is reflected;
an image correcting unit that executes correction processing for the images obtained from the imaging element and generates a two-dimensional image; and
a parallax image generating unit that applies the parallax information generated by the parallax detecting unit, executes image conversion processing of the two-dimensional image generated by the image correcting unit, and generates a left eye image and a right eye image for three-dimensional image display.

(10) The image processing apparatus according to (9),
wherein the parallax image generating unit executes 2D3D conversion processing for generating the left eye image and the right eye image for three-dimensional image display by image conversion processing to which the parallax information is applied, for the two-dimensional image generated by the image correcting unit.

(11) The image processing apparatus according to (10),
wherein the 2D3D conversion processing that is executed by the image processing unit is 2D3D conversion processing for executing image shift processing according to the object distance for the first viewing point images and generating the left eye image and the right eye image for three-dimensional image display.

(12) An image processing apparatus including:
an imaging element;
an incident light control unit that performs incident light control to cause the imaging element to photograph a plurality of viewing point images corresponding to images observed from different viewing points; and
an image processing unit that executes signal processing for an output signal of the imaging element,
wherein the incident light control unit includes:
a first polarizing unit that has a first polarization region and a second polarization region to transmit different polarized light; and
a second polarizing unit that causes transmission light of the first polarizing unit to be incident and includes a third polarization region to transmit only the transmission light of the first polarization region and a fourth polarization region to transmit only the transmission light of the second polarization region, and
the image processing unit executes interpolation processing for setting pixel values to defective pixel regions of two different viewing point images of an image based on transmission light of the third polarization region of the second polarizing unit and an image based on transmission light of the fourth polarization region of the second polarizing unit, and generates a left eye image and a right eye image for three-dimensional image display.

(13) The image processing apparatus according to (12),
wherein the third polarization region and the fourth polarization region of the second polarizing unit are polarization regions that are configured using a wire grid polarizer.

A method of the processing that is executed in the apparatus and a program for executing the processing are included in the configuration of the present disclosure.

The series of processes described in the present disclosure can be executed by hardware, software, or a combination of the hardware and the software. When the series of processes is executed by the software, a program having a recorded processing sequence may be installed in a memory in a computer embedded in dedicated hardware and may be executed or may be installed in a general-purpose computer in which various processing can be executed and may be executed. For example, the program may be recorded previously in a recording medium. The program may be installed from the recording medium to the computer or the program may be received through a network such as a local area network (LAN) and the Internet and may be installed in the recording medium such as an embedded hard disk.

The various processing described in the present disclosure may be executed temporally according to the order described or may be executed in parallel or individually according to the processing capability of an apparatus executing the processing or the necessity. In the present disclosure, a system has a logical set configuration of a plurality of apparatuses and each apparatus may not be provided in the same casing.

As described above, according to one embodiment of the present disclosure, a plurality of viewing point images can be acquired on the basis of one photographed image and an image for three-dimensional image display can be generated.

Specifically, an imaging element photographs a plurality of viewing point images corresponding to images observed from different viewing points and an image processing unit separates an output signal of the imaging element, acquires the plurality of viewing point images corresponding to the images observed from the different viewing points, and generates a left eye image and a right eye image for three-dimensional image display on the basis of the plurality of acquired viewing point images. The image processing unit generates parallax information on the basis of the plurality of viewing point images obtained from the imaging element and generates a left eye image and a right eye image for three-dimensional image display by 2D3D conversion processing using the generated parallax information. By this configuration, a configuration in which a plurality of viewing point images are acquired on the basis of one photographed image and images for three-dimensional image display are generated is realized.

The present disclosure contains subject matter related to that disclosed in Japanese Priority Patent Application JP 2011-171039 filed in the Japan Patent Office on Aug. 4, 2011, the entire content of which is hereby incorporated by reference.

What is claimed is:

1. An image processing apparatus, comprising:
an image processing unit configured to execute signal processing for an output signal of an imaging element, the image processing unit comprising:
a parallax detecting unit configured to apply two different viewing point images obtained from the imaging element, and to generate parallax information, wherein the parallax detecting unit is further configured such that the two different viewing point images are obtained from output signals from pixels forming the imaging element corresponding to a microlens arrangement region; and
an image correcting unit configured to execute correction processing for a central viewing point image from the imaging element and to generate a two-dimensional image, and wherein the image correcting unit is further configured such that the central viewing point image is obtained from output signals from pixels forming the imaging element corresponding to a microlens non-setting region.

2. The image processing apparatus according to claim 1, wherein the image processing unit further comprises:
a parallax image generating unit configured to apply the parallax information generated by the parallax detecting unit, and to execute image conversion processing of the two-dimensional image generated by the image correcting unit.

3. The image processing apparatus according to claim 1, further comprising:
the imaging element; and
an incident light control unit comprising a microlens array in which microlenses are arranged on a part of a region of the imaging element, the incident light control unit being configured to perform incident light control to cause the imaging element to photograph a plurality of viewing point images corresponding to images observed from different viewing points, and wherein the incident light control unit has an incident light control configuration to acquire three viewing point images including a left eye viewing point image, a right eye viewing point image, and the central viewing point image.

4. The image processing apparatus according to claim 3, wherein the incident light control unit includes:
a first polarizing unit that has a first polarization region and a second polarization region to transmit different polarized light; and
a second polarizing unit configured to cause transmission light of the first polarizing unit to be incident and that includes a third polarization region to transmit only the transmission light of the first polarization region, a fourth polarization region to transmit only the transmission light of the second polarization region, and a total transmission region to transmit the transmission light of the first polarization region and the second polarization region, and
wherein the image processing unit is further configured such that the two different viewing point images include an image based on the transmission light of the third polarization region of the second polarizing unit and an image based on the transmission light of the fourth polarization region of the second polarizing unit.

5. The image processing apparatus according to claim 4, wherein the third polarization region and the fourth polarization region of the second polarizing unit are polarization regions that are configured using a wire grid polarizer.

6. The image processing apparatus according to claim 3, wherein:
the incident light control unit further includes a light shielding film that is set to an arrangement region of the microlenses and shields a part of incident light with respect to the imaging element;
the parallax detecting unit is further configured such that the two different viewing point images are obtained from output signals from pixels forming the imaging element corresponding to the arrangement region of the microlenses and the light shielding film;
the image correcting unit is further configured to execute correction processing with respect to an image obtained from output signals of pixels forming the imaging element corresponding to a non-setting region of the microlenses and the light shielding film.

7. The image processing apparatus according to claim 3, wherein the imaging element includes:
a left/right viewing point image acquisition region to acquire two different viewing point images to generate parallax information in which an object distance is reflected; and
a central viewing point image acquisition region to generate an image photographed from one viewing point.

8. The image processing apparatus according to claim 7, wherein the left/right viewing point image acquisition region is configured using pixels of one color, and
the image processing unit has a parallax detecting unit configured to apply two different viewing point images obtained from output signals of the left/right viewing point image acquisition region configured using the pixels of one color.

9. The image processing apparatus according to claim 3, wherein the incident light control unit includes:
a first polarizing unit that has a first polarization region and a second polarization region to transmit different polarized light; and
a second polarizing unit that causes transmission light of the first polarizing unit to be incident and includes a third polarization region to transmit only the transmission light of the first polarization region and a fourth polarization region to transmit only the transmission light of the second polarization region, and
wherein the image processing unit is further configured to execute interpolation processing for setting pixel values to defective pixel regions of two different viewing point images of an image based on transmission light of the third polarization region of the second polarizing unit and an image based on transmission light of the fourth polarization region of the second polarizing unit.

10. The image processing apparatus according to claim 9, wherein the third polarization region and the fourth polarization region of the second polarizing unit are polarization regions that are configured using a wire grid polarizer.

11. The image processing apparatus according to claim 1, wherein the image processing unit is further configured to generate a depth map in which object distance information of images is reflected as parallax information in which an object distance is reflected, and to generate a left eye image and a right eye image for three-dimensional image display by image conversion processing to which the depth map is applied.

12. The image processing apparatus according to claim 1, wherein the parallax image generating unit is further configured to execute 2D3D conversion processing for generating a left eye image and a right eye image for three-dimensional image display by image conversion processing to which the parallax information is applied, for the two-dimensional image generated by the image correcting unit.

13. The image processing apparatus according to claim 12, wherein the 2D3D conversion processing that is executed by the image processing unit is 2D3D conversion processing for executing image shift processing according to the object distance for the first viewing point images and generating the left eye image and the right eye image for three-dimensional image display.

14. An image processing method of executing image processing by an image processing apparatus, comprising:
separating an output signal from an imaging element into a plurality of viewing point images corresponding to images observed from different viewing points by separation processing of the output signal from the imaging element, the plurality of viewing point images including two different viewing point images obtained from output signals from pixels forming the imaging element corresponding to a microlens arrangement region;
applying the two different viewing point images obtained by the separation processing in the separation step;
generating parallax information;
executing correction processing for a central viewing point image obtained from output signals from pixels forming the imaging element corresponding to a microlens non-setting region; and
generating a two-dimensional image.

15. The image processing method according to claim 14, further comprising:
applying the parallax information generated in the parallax generation step; and
executing image conversion processing of the two-dimensional image generated in the image correction step.

16. The image processing method according to claim 15, further comprising:
with an incident light control unit comprising a microlens array in which microlenses are arranged on a part of a region of the imaging element, performing incident light control to cause the imaging element to photograph a plurality of viewing point images corresponding to images observed from different viewing points, and
controlling the incident light control unit to acquire three viewing point images including a left eye viewing point image, a right eye viewing point image, and the central viewing point image.

17. A non-transitory computer-readable medium encoded with instructions which, when executed by a processor, cause the processor to:
separate an output signal from an imaging element into a plurality of viewing point images corresponding to images observed from different viewing points by separation processing of the output signal from the imaging element, the plurality of viewing point images including two different viewing point images obtained from output signals from pixels forming the imaging element corresponding to a microlens arrangement region;
apply the two different viewing point images obtained by the separation processing in the separation step;
generate parallax information;
execute correction processing for a central viewing point image obtained from output signals from pixels forming the imaging element corresponding to a microlens non-setting region; and
generate a two-dimensional image.

18. The computer-readable medium of claim 17, encoded with further instructions which, when executed by a processor, cause the processor to:
apply the parallax information generated in the parallax generation step; and
execute image conversion processing of the two-dimensional image generated in the image correction step.

* * * * *